(12) United States Patent
Furihata et al.

(10) Patent No.: US 10,609,401 B2
(45) Date of Patent: Mar. 31, 2020

(54) DEVICE AND METHOD FOR BLOCK COMPRESSION AND BLOCK DECOMPRESSION

(71) Applicant: Synaptics Japan GK, Tokyo (JP)

(72) Inventors: Hirobumi Furihata, Tokyo (JP); Masao Orio, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 190 days.

(21) Appl. No.: 15/594,173

(22) Filed: May 12, 2017

(65) Prior Publication Data

US 2017/0332090 A1 Nov. 16, 2017

(30) Foreign Application Priority Data

May 13, 2016 (JP) .................................. 2016-096958

(51) Int. Cl.
*H04N 19/426* (2014.01)
*H04N 19/124* (2014.01)
*H04N 19/176* (2014.01)

(52) U.S. Cl.
CPC ......... *H04N 19/426* (2014.11); *H04N 19/124* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 2006/0061826 | A1* | 3/2006 | Miyasaka | G09G 3/2048 358/3.13 |
| 2006/0188023 | A1* | 8/2006 | Ju | H04N 19/124 375/240.22 |
| 2009/0322713 | A1* | 12/2009 | Furihata | G09G 3/3611 345/204 |
| 2017/0054449 | A1* | 2/2017 | Mani | H03M 7/4075 |

FOREIGN PATENT DOCUMENTS

| | | |
|---|---|---|
| JP | 2010011386 A | 1/2010 |
| JP | 2012124837 A | 6/2012 |
| JP | 2017184092 A | 10/2017 |

* cited by examiner

*Primary Examiner* — Kevin Ky
(74) *Attorney, Agent, or Firm* — Patterson + Sheridan, LLP

(57) ABSTRACT

An image compression device includes: a first compression processing circuit configured to generate a first compressed image data by performing a first block compression process on an image data and a dither value generator circuit. When the first compressed image data associated with a compression target block is generated, the dither value generator circuit is configured to generate at least one dither value in response to block coordinates indicating a position of the compression target block in an image and the first compression processing circuit is configured to perform a quantization process using the at least one dither value in the first block compression process.

18 Claims, 29 Drawing Sheets

Fig. 2
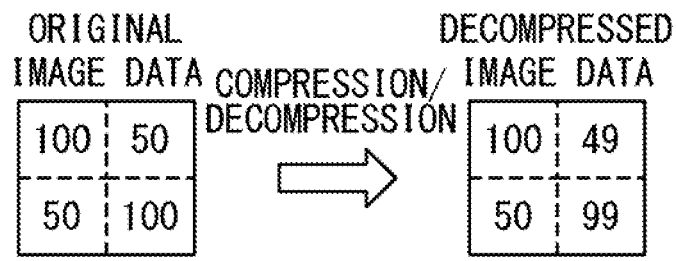
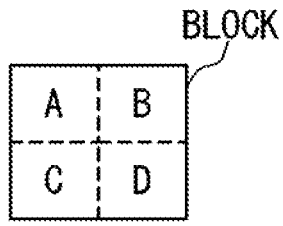
Fig. 3
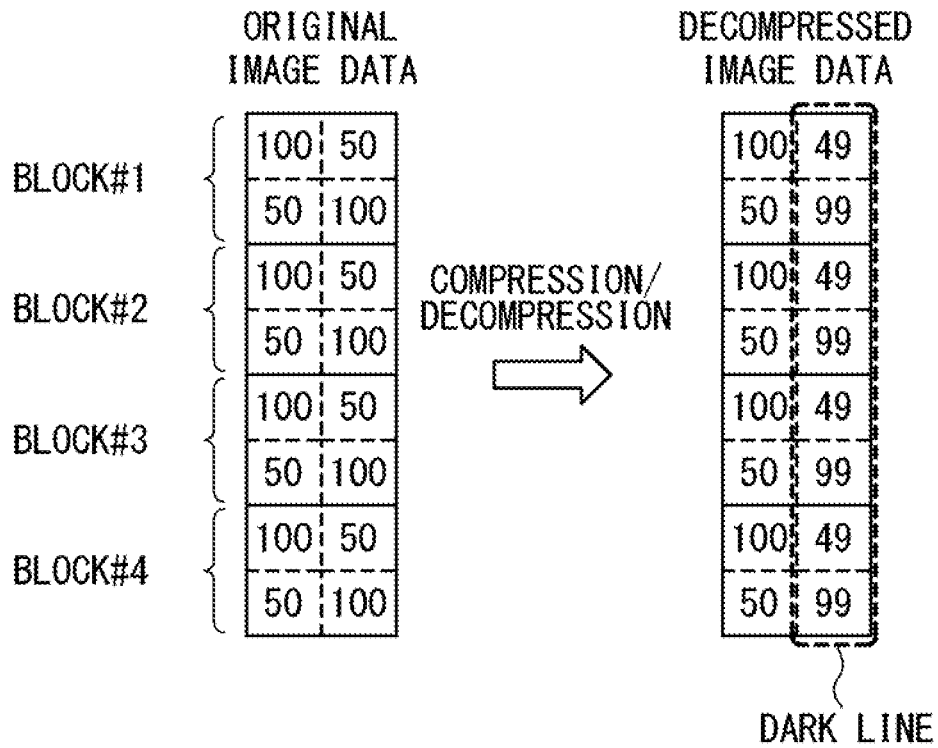

POORLY CORRELATED FOUR PIXELS

TWO PIXELS ARE HIGHLY CORRELATED AND REMAINING
TWO ARE POORLY CORRELATED

TWO PIXELS ARE HIGHLY CORRELATED AND REMAINING
TWO ARE HIGHLY CORRELATED

FOUR PIXELS ARE HIGHLY CORRELATED

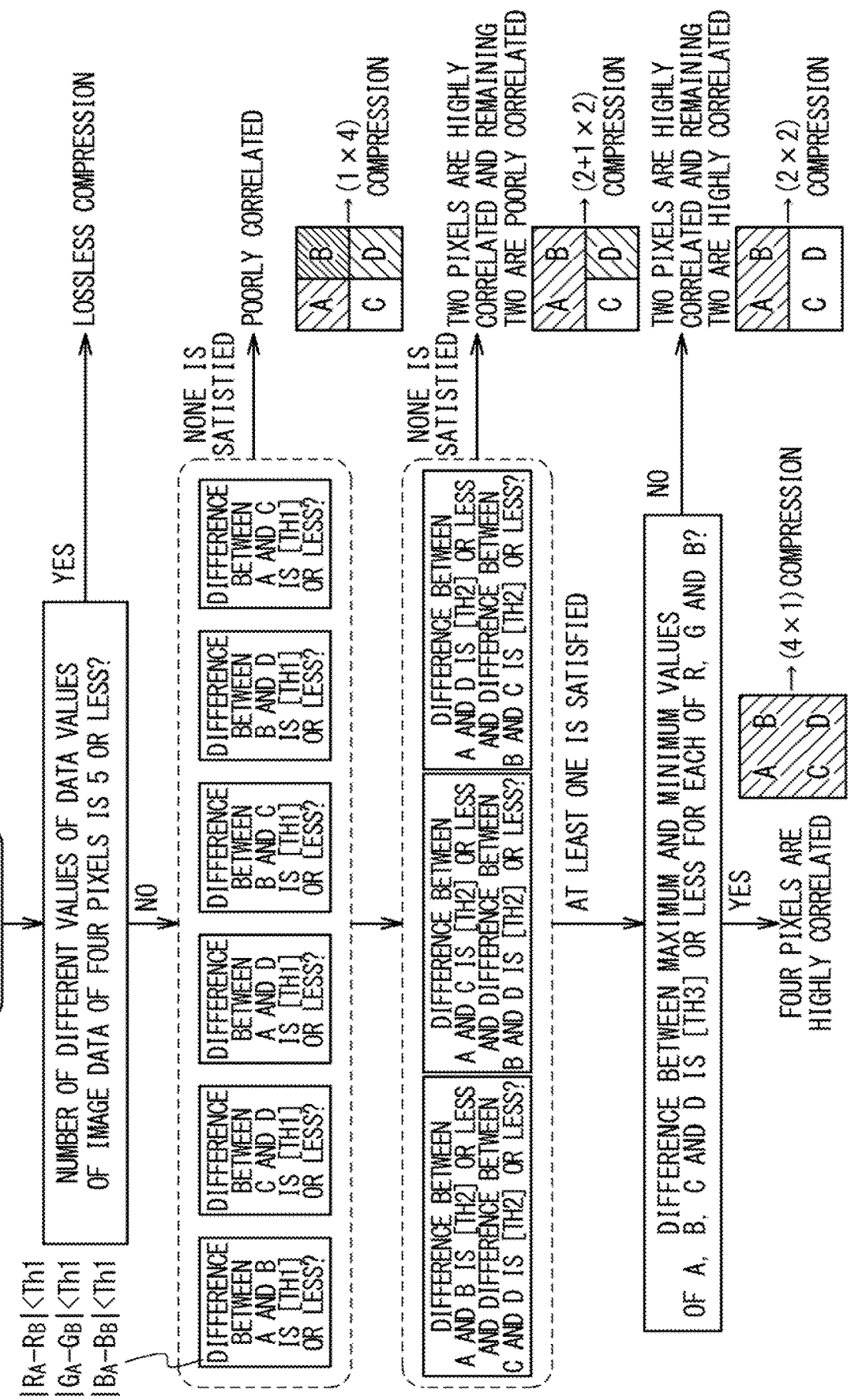

Fig. 16A

| PIXEL | R | G | B |
|---|---|---|---|
| A | 10 | 5 | 15 |
| B | 10 | 5 | 15 |
| C | 10 | 5 | 15 |
| D | 10 | 5 | 15 |

Fig. 16B

| PIXEL | R | G | B |
|---|---|---|---|
| A | 50 | 50 | 50 |
| B | 200 | 200 | 200 |
| C | 100 | 100 | 100 |
| D | 10 | 10 | 10 |

Fig. 16C

| PIXEL | R | G | B |
|---|---|---|---|
| A | 50 | 5 | 5 |
| B | 200 | 5 | 5 |
| C | 100 | 5 | 5 |
| D | 10 | 5 | 5 |

Fig. 16D

| PIXEL | R | G | B |
|---|---|---|---|
| A | 5 | 5 | 5 |
| B | 5 | 200 | 5 |
| C | 5 | 100 | 5 |
| D | 5 | 10 | 5 |

Fig. 16E

| PIXEL | R | G | B |
|---|---|---|---|
| A | 5 | 5 | 50 |
| B | 5 | 5 | 200 |
| C | 5 | 5 | 100 |
| D | 5 | 5 | 10 |

Fig. 16F

| PIXEL | R | G | B |
|---|---|---|---|
| A | 50 | 5 | 50 |
| B | 200 | 5 | 200 |
| C | 100 | 5 | 100 |
| D | 10 | 5 | 10 |

Fig. 16G

| PIXEL | R | G | B |
|---|---|---|---|
| A | 50 | 50 | 5 |
| B | 200 | 200 | 5 |
| C | 100 | 100 | 5 |
| D | 10 | 10 | 5 |

Fig. 16H

| PIXEL | R | G | B |
|---|---|---|---|
| A | 5 | 5 | 5 |
| B | 5 | 200 | 200 |
| C | 5 | 100 | 100 |
| D | 5 | 10 | 10 |

Fig. 17

| COMPRESSION PROCESS IDENTIFICATION DATA (4 bits) | PATTERN TYPE DATA (3 bits) | DATA#1 (8 bits) | DATA#2 (8 bits) | DATA#3 (8 bits) | DATA#4 (8 bits) | DATA#5 (8 bits) | PADDING (1 bit) |

Fig. 18

| COMPRESSION PROCESS IDENTIFICATION DATA (1 bit) | R$_A$*DATA (4 bits) | G$_A$*DATA (4 bits) | B$_A$*DATA (4 bits) | R$_B$*DATA (4 bits) | G$_B$*DATA (4 bits) | B$_B$*DATA (4 bits) |

| R$_C$*DATA (4 bits) | G$_C$*DATA (4 bits) | B$_C$*DATA (4 bits) | R$_D$*DATA (4 bits) | G$_D$*DATA (4 bits) | B$_D$*DATA (3 bits) |

Fig. 19A (1×4) COMPRESSION

| PIXEL | R | G | B |
|---|---|---|---|
| A | 50 | 1 | 30 |
| B | 51 | 100 | 39 |
| C | 4 | 4 | 100 |
| D | 100 | 1 | 2 |

↑ ADD DITHER VALUE

| PIXEL | R | G | B |
|---|---|---|---|
| A | 50 | 1 | 30 |
| B | 56 | 105 | 44 |
| C | 14 | 14 | 110 |
| D | 115 | 16 | 17 |

↑ ROUNDING/BIT TRUNCATION

| PIXEL | R | G | B |
|---|---|---|---|
| A | 3 | 0 | 2 |
| B | 4 | 7 | 3 |
| C | 1 | 1 | 7 |
| D | 7 | 1 | 1 |

Fig. 19B (1 x 4) DECOMPRESSION

| PIXEL | R | G | B |
|---|---|---|---|
| A | 3 | 0 | 2 |
| B | 4 | 7 | 3 |
| C | 1 | 1 | 7 |
| D | 7 | 1 | 1 |

↑ LEFT SHIFT

| PIXEL | R | G | B |
|---|---|---|---|
| A | 48 | 0 | 32 |
| B | 64 | 112 | 48 |
| C | 16 | 16 | 112 |
| D | 112 | 16 | 32 |

↑ SUBTRACT DITHER VALUE

| PIXEL | R | G | B |
|---|---|---|---|
| A | 48 | 0 | 32 |
| B | 59 | 107 | 43 |
| C | 6 | 6 | 102 |
| D | 97 | 1 | 17 |

Fig. 20

| COMPRESSION PROCESS IDENTIFICATION DATA (2 bits) | PATTERN RECOGNITION DATA (3 bits) | R REPRE- SENTATIVE VALUE (5 or 6 bits) | G REPRE- SENTATIVE VALUE (5 or 6 bits) | B REPRE- SENTATIVE VALUE (5 bits) | β COMPARISON DATA (1 bit×2) | MAGNITUDE RELATION DATA (1 bit × 0~2) |
|---|---|---|---|---|---|---|

DATA FOR HIGHLY CORRELATED TWO PIXELS

| $R_i*$DATA (4 bits) | $G_i*$DATA (4 bits) | $B_i*$DATA (4 bits) | $R_j*$DATA (4 bits) | $G_j*$DATA (4 bits) | $B_j*$DATA (4 bits) |
|---|---|---|---|---|---|

DATA FOR POORLY CORRELATED TWO PIXELS

Fig. 21A (2+1×2) COMPRESSION

| PIXEL | R | G | B |
|---|---|---|---|
| A | 50 | 2 | 30 |
| B | 59 | 1 | 39 |
| C | 4 | 4 | 100 |
| D | 100 | 1 | 2 |

PIXELS A AND B:
HIGHLY CORRELATED (A+B+1)/2
COMPARE WITH β
WHICH IS LARGER

| PIXEL | R | G | B |
|---|---|---|---|
| A | 50 | 2 | 30 |
| B | 59 | 1 | 39 |
|  | → 55 | 2 | 35 |
|  | LARGER SMALLER | - | - |
|  | B | - | - |

ADD DITHER VALUE →

| | R | G | B |
|---|---|---|---|
| | 55 | 2 | 35 |

ROUNDING/
BIT TRUNCATION →
REPRESENTATIVE VALUE

| | R | G | B |
|---|---|---|---|
| | 7 | 1 | 4 |

| PIXEL | R | G | B |
|---|---|---|---|
| C | 4 | 4 | 100 |
| D | 100 | 1 | 2 |

ADD DITHER VALUE →

| PIXEL | R | G | B |
|---|---|---|---|
| C | 14 | 14 | 110 |
| D | 115 | 16 | 17 |

ROUNDING/
BIT TRUNCATION →

| PIXEL | R | G | B |
|---|---|---|---|
| C | 1 | 1 | 7 |
| D | 7 | 1 | 1 |

Fig. 21B (2+1×2) DECOMPRESSION

| | R | G | B |
|---|---|---|---|
| REPRESENTATIVE VALUE | 7 | 1 | 4 |
| COMPARE WITH β | LARGER | SMALLER | — |
| WHICH IS LARGER | B | — | — |

LEFT SHIFT →

| | R | G | B |
|---|---|---|---|
| | 56 | 4 | 32 |
| COMPARE WITH β | LARGER | SMALLER | — |
| WHICH IS LARGER | B | — | — |

SUBTRACT DITHER VALUE →

| | R | G | B |
|---|---|---|---|
| | 56 | 4 | 32 |
| COMPARE WITH β | LARGER | SMALLER | — |
| WHICH IS LARGER | B | — | — |

ADD ±5 BASED ON COMPARISON BETWEEN A AND B →

| PIXEL | R | G | B |
|---|---|---|---|
| A | 51 | 4 | 32 |
| B | 61 | 4 | 32 |

| PIXEL | R | G | B |
|---|---|---|---|
| C | 1 | 1 | 7 |
| D | 7 | 1 | 1 |

LEFT SHIFT →

| PIXEL | R | G | B |
|---|---|---|---|
| C | 16 | 16 | 112 |
| D | 112 | 16 | 16 |

SUBTRACT DITHER VALUE →

| PIXEL | R | G | B |
|---|---|---|---|
| C | 6 | 6 | 102 |
| D | 97 | 1 | 1 |

Fig. 22

| COMPRESSION PROCESS IDENTIFICATION DATA (3 bits) | PATTERN RECOGNITION DATA (2 bits) | TWO PIXELS DATA ||| TWO PIXELS DATA ||| β COMPARISON DATA (1 bit×6) | MAGNITUDE RELATION DATA (1 bit × 0~6) |
|---|---|---|---|---|---|---|---|---|---|
| | | R REPRESENTATIVE VALUE#1 (5 or 6 bits) | G REPRESENTATIVE VALUE#1 (5 or 6 bits) | B REPRESENTATIVE VALUE#1 (5 or 6 bits) | R REPRESENTATIVE VALUE#2 (5 or 6 bits) | G REPRESENTATIVE VALUE#2 (6 or 7 bits) | B REPRESENTATIVE VALUE#2 (5 or 6 bits) | | |

Fig. 23A (2×2) COMPRESSION

| PIXEL | R | G | B |
|---|---|---|---|
| A | 50 | 2 | 30 |
| B | 59 | 1 | 39 |
| C | 100 | 80 | 8 |
| D | 100 | 85 | 2 |

PIXELS A AND B: HIGHLY CORRELATED
PIXELS C AND D: HIGHLY CORRELATED

| PIXEL | R | G | B |
|---|---|---|---|
| A | 50 | 2 | 30 |
| B | 59 | 1 | 39 |

(A+B+1)/2 → 55  2  35
COMPARE WITH β   LARGER  SMALLER  LARGER
WHICH IS LARGER  B  —  B

ADD DITHER VALUE →

| R | G | B |
|---|---|---|
| 55 | 2 | 35 |

ROUNDING/BIT TRUNCATION → REPRESENTATIVE VALUE#1

| R | G | B |
|---|---|---|
| 7 | 1 | 4 |

| 画素 | R | G | B |
|---|---|---|---|
| C | 100 | 80 | 8 |
| D | 100 | 85 | 2 |

(C+D+1)/2 → 100  83  5
COMPARE WITH β   SMALLER  LARGER  LARGER
WHICH IS LARGER  —  D  C

ADD DITHER VALUE →

| R | G | B |
|---|---|---|
| 110 | 93 | 15 |

ROUNDING/BIT TRUNCATION → REPRESENTATIVE VALUE#2

| R | G | B |
|---|---|---|
| 28 | 23 | 2 |

Fig. 24

| COMPRESSION PROCESS IDENTIFICATION DATA (4 bits) | Ymin (10 bits) | Ydist1 (4 bits) | Ydist2 (4 bits) | Ydist3 (4 bits) | ADDRESS (2 bits) | Gb' (10 bits) | Cr' (10 bits) |

Fig. 25A (4×1) COMPRESSION

| PIXEL | R | G | B |
|---|---|---|---|
| A | 10 | 12 | 14 |
| B | 6 | 7 | 8 |
| C | 5 | 4 | 3 |
| D | 0 | 1 | 2 |

MATRIX OPERATION →

| PIXEL | Y | Cb | Cr |
|---|---|---|---|
| A | 48 | 2 | −2 |
| B | 28 | 1 | −1 |
| C | 16 | −1 | 1 |
| D | 4 | 1 | −1 |

↑

CALCULATION OF Ymin, Ydist1, Ydist2, Ydist3, Cb' AND Cr'

Fig. 25B

| PIXEL | Y | Cb' | Cr' |
|-------|----|-----|-----|
| A | 48 | 1 | -1 |
| B | 28 | 1 | -1 |
| C | 16 | 1 | -1 |
| D | 4 | 1 | -1 |

MATRIX OPERATION →

| PIXEL | R | G | B |
|-------|----|----|----|
| A | 11 | 12 | 13 |
| B | 6 | 7 | 8 |
| C | 3 | 4 | 5 |
| D | 0 | 1 | 2 |

(4×1) DECOMPRESSION

REPRODUCTION OF Y0 TO Y3 →

DEVICE AND METHOD FOR BLOCK COMPRESSION AND BLOCK DECOMPRESSION

CROSS REFERENCE

This application claims priority of Japanese Patent Application No. 2016-096958, filed on May 13, 2016, the disclosure of which is incorporated herein by reference.

TECHNICAL FIELD

The present invention relates to an image compression device, image decompression device, image compression and decompression system and a display driver, more particularly, to block compression in which image data are compressed in units of blocks.

BACKGROUND ART

Block compression, in which image data are compressed in units of blocks, is one of the most widely used techniques for compressing image data. A block referred herein is a unit of compression processing defined by dividing a frame image; a block is composed of a predetermined number of pixels arranged in a specific arrangement (for example, arrayed in n rows and m columns for n and m being integers at least one of which is two or more).

FIG. 1 schematically illustrates one example of definition of blocks. A frame image 100 is divided into blocks 101 arrayed in rows and columns. In the example illustrated in FIG. 1, each block 101 is composed of 2×2 pixels (pixels arrayed in two rows and two columns). The number of pixels included in each block 101 and the arrangement of pixels in each block 101 may be variously modified. For example, a block is defined as 8×8 pixels in the JPEG (Joint Photographic Experts Group) format as is well known in the art. The numbers of rows and columns of each block may be different from each other; for example, a block may be defined as 1×4 pixels (pixels arrayed in one row and four columns). Japanese Patent Application Publication No. 2010-11386 A discloses an example of block compression.

Block compression often includes a quantization process to reduce the number of bits. Most typically, a dither value determined for each pixel is used in a quantization process. In one example, a quantization process involves addition of a dither value to the grayscale value of each color or a value obtained from the grayscale value (for example, the luminance value), followed by bit truncation or rounding of the value obtained by the addition.

In general, it is preferable to suppress image deterioration in compression processing and this also applies to the block compression. As a result of inventors' study with respect to image deterioration in block compression including a quantization process, the inventors have discovered that a sort of image quality deterioration is caused by inappropriate generation of dither values used in the quantization process.

SUMMARY

Therefore, an objective of the present disclosure is to provide a technique for suppressing image quality deterioration caused by block compression. Other objectives and new features of the present disclosure would be understood by a person skilled in the art from the following disclosure.

In one embodiment, an image compression device includes: a compression processing circuit configured to generate compressed image data by performing a block compression process on an image data and a dither value generator circuit. When the compressed image data associated with a certain compression target block is generated, the dither value generator circuit is configured to generate a dither value in response to block coordinates indicating the position of the compression target block in the image and the compression processing circuit is configured to perform a quantization process using the dither value in the block compression process.

In another embodiment, an image decompression circuit includes a first decompression processing circuit configured to generate first decompressed image data by performing a decompression process on a compressed image data generated through a block compression process and a dither value generator circuit. When the first decompressed image data associated with a decompression target block is generated, the dither value generator circuit is configured to generate at least one dither value in response to block coordinates indicating a position of the decompression target block in an image and the first decompression processing circuit is configured to perform an inverse quantization process using the at least one dither value in the first decompression process.

In still another embodiment, an image compression and decompression system includes block compression circuitry configured to generate a compressed image data by performing a block compression process on an image data and block decompression circuitry configured to generate a decompressed image data by performing a decompression process adapted to the block compression process on the compressed image data. When the compressed image data associated with a certain compression target block is generated, the block compression circuitry is configured to generate at least one first dither value in response to first block coordinates indicating the position of the compression target block in the image and perform a quantization process using the at least one first dither value in the block compression process. When the decompressed image data associated with a certain decompression target block is generated, the block decompression circuitry is configured to generate at least one second dither value in response to second block coordinates indicating the position of the decompression target block in the image and perform an inverse quantization process using the at least one second dither value in the decompression process.

The above-described image compression device, image decompression device, and image compression and decompression system are preferably used, for example, in a display driver which drives a display panel.

BRIEF DESCRIPTION OF THE DRAWINGS

The above and other advantages and features of the present invention will be more apparent from the following description taken in conjunction with the accompanied drawings, in which:

FIG. 2 schematically illustrates an example of an image data of a compression target block and a decompressed image data;

FIG. 3 illustrates an example of an image in which four blocks experiencing errors which reduce the grayscale values of the pixels positioned in the right column are arrayed in one column;

FIG. 15 is a flowchart illustrating the procedure of correlation determination and selection of a suitable compression process on the basis of the determined correlation, which are performed in a pixel correlation determination circuit in the present implementation example;

FIGS. 16A to 16H illustrate specific patterns for which a lossless compression process is performed;

FIG. 17 illustrates an example of the format of a lossless compressed data;

FIG. 18 schematically illustrates the format of a (1×4) compressed data;

FIG. 19A schematically illustrates data processing in a (1×4) compression process;

FIG. 19B schematically illustrates data processing in decompression processing performed on a compressed image data compressed through the (1×4) compression process;

FIG. 20 schematically illustrates the format of a (2+1×2) compressed data;

FIG. 21A schematically illustrates data processing in a (2+1×2) compression process;

FIG. 21B schematically illustrates data processing in decompression processing performed on a compressed image data compressed through the (2+1×2) compression process;

FIG. 22 schematically illustrates the format of a (2×2) compressed data;

FIG. 23A schematically illustrates data processing in a (2×2) compression process;

FIG. 24 schematically illustrates the format of a (4×1) compressed data;

FIG. 25A schematically illustrates data processing in a (4×1) compression process; and FIG. 25B schematically illustrates data processing in decompression processing performed on a compressed image data compressed through the (4×1) compression process.

DETAILED DESCRIPTION OF PREFERRED EMBODIMENTS

Figure 1:
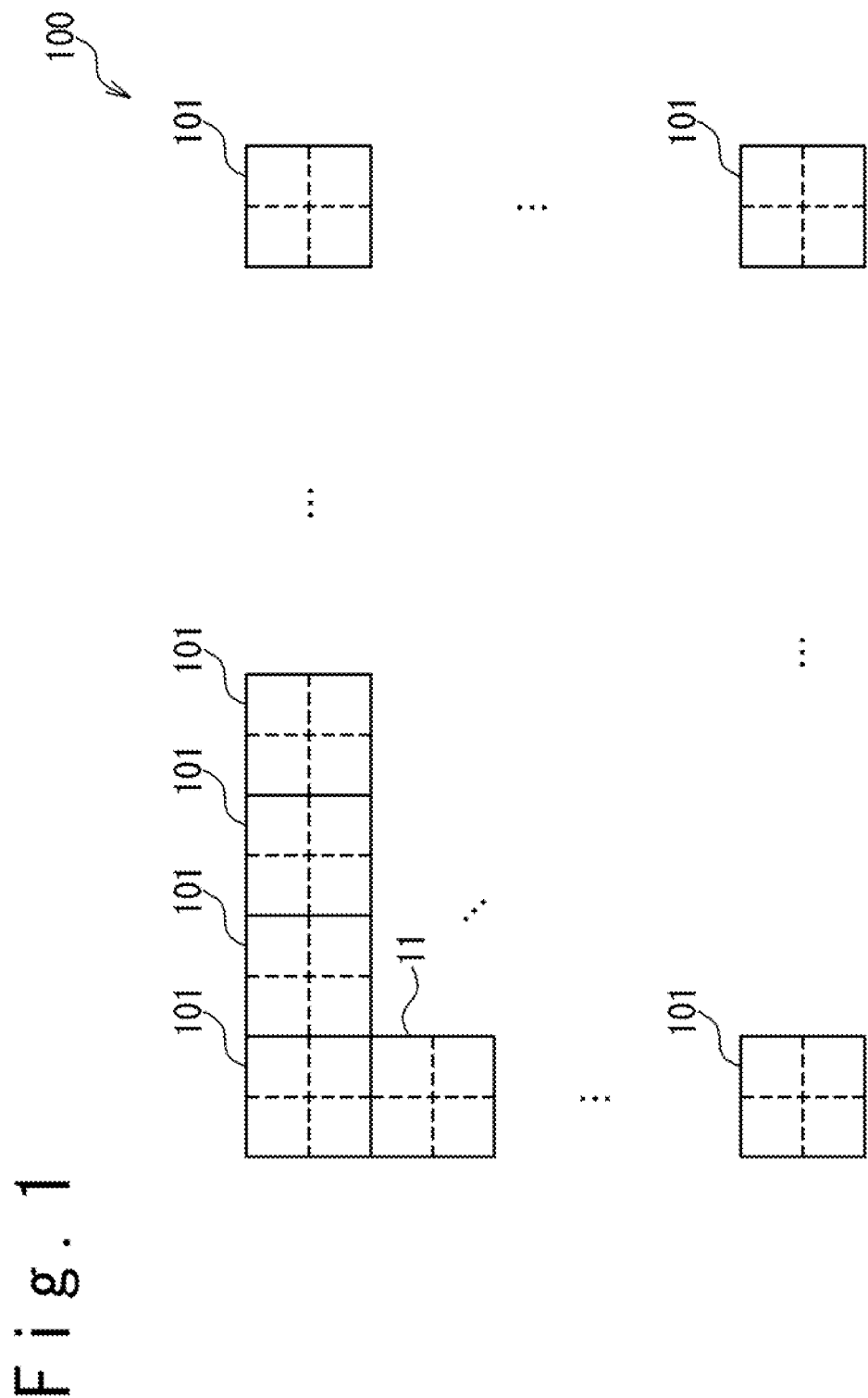
FIG. 1 schematically illustrates one example of definition of blocks.

Various Embodiments of the present disclosure will be now described herein with reference to attached drawings. It should be noted that same or corresponding elements may be denoted by same or corresponding reference numerals. It should be also noted that suffixes may be attached with reference numerals for distinguishing same elements from each other.

For easiness of understanding of a technical concept disclosed in the present disclosure, a description is first given of image quality deterioration in block compression processing, especially, image quality deterioration caused by inappropriate generation of dither values used in a quantization process.

FIG. 2 schematically illustrates an image data associated with a block for which compression processing is to be done (which is referred to as "compression target block", hereinafter) and a decompressed image data obtained by performing decompression processing on the compressed image data obtained by the compression processing. In the example illustrated in FIG. 2, each block is defined as consisting of 2×2 pixels. In the description given below, the upper left pixel of a block, which consists of 2×2 pixels, may be referred to as pixel A, and the upper right pixel may be referred to as pixel B. Similarly, the lower left pixel may be referred to as pixel C and the lower right pixel may be referred to as pixel D.

In block compression processing, there may be a case in which such errors that luminance values of pixels in a specific row or column of each block are reduced (or increased) compared with other row(s) or column(s) although the absolute values of the errors are small. Discussed below is the case illustrated in FIG. 2, in which the grayscale values of pixels A, B, C and D indicated in the original image data associated with blocks #1 to #4 which are vertically arrayed are 100, 50, 50 and 100, respectively, for all of the red (R), green (G) and blue (B) colors, and the grayscale values of pixels A, B, C and D indicated in the decompressed image data obtained by performing compression processing and decompression processing on the image data are 100, 49, 50 and 99, respectively, for all of the red (R), green (G) and blue (B) colors. Although an error of "1" is generated by the compression processing and decompression processing for the grayscale values of pixels B and D positioned in the right column of the target blocks, the error would be appreciated as being small with respect to individual target blocks.

However, when blocks which suffer from such errors that the grayscale values in a specific row or column are reduced (or increased) compared with other row(s) or column(s) are arrayed in rows and columns in the image as illustrated in FIG. 2, this causes unevenness (or mura) in the image, deteriorating the image quality. FIG. 3 illustrates an example of an image in which blocks #1 to #4 experiencing such errors that the grayscale values of pixels B and D positioned in the right column are reduced are arrayed in one column. In the image illustrated in FIG. 3, a column of pixels with low luminance values is generated and the column of pixels is perceived as a dark line by a user who observes the image.

According to an inventors' study, this sort of image quality deterioration can be suppressed by appropriately generating dither values used in the quantization process. As described in the following, dither values used in compression processing performed on a block are generated in response to the block coordinates (that is, the positon of the block in the image). This allows distributing the positions at which errors are generated in respective blocks over the image, effectively suppressing generation of visually perceivable unevenness (or mura) in the image.

Figure 4:
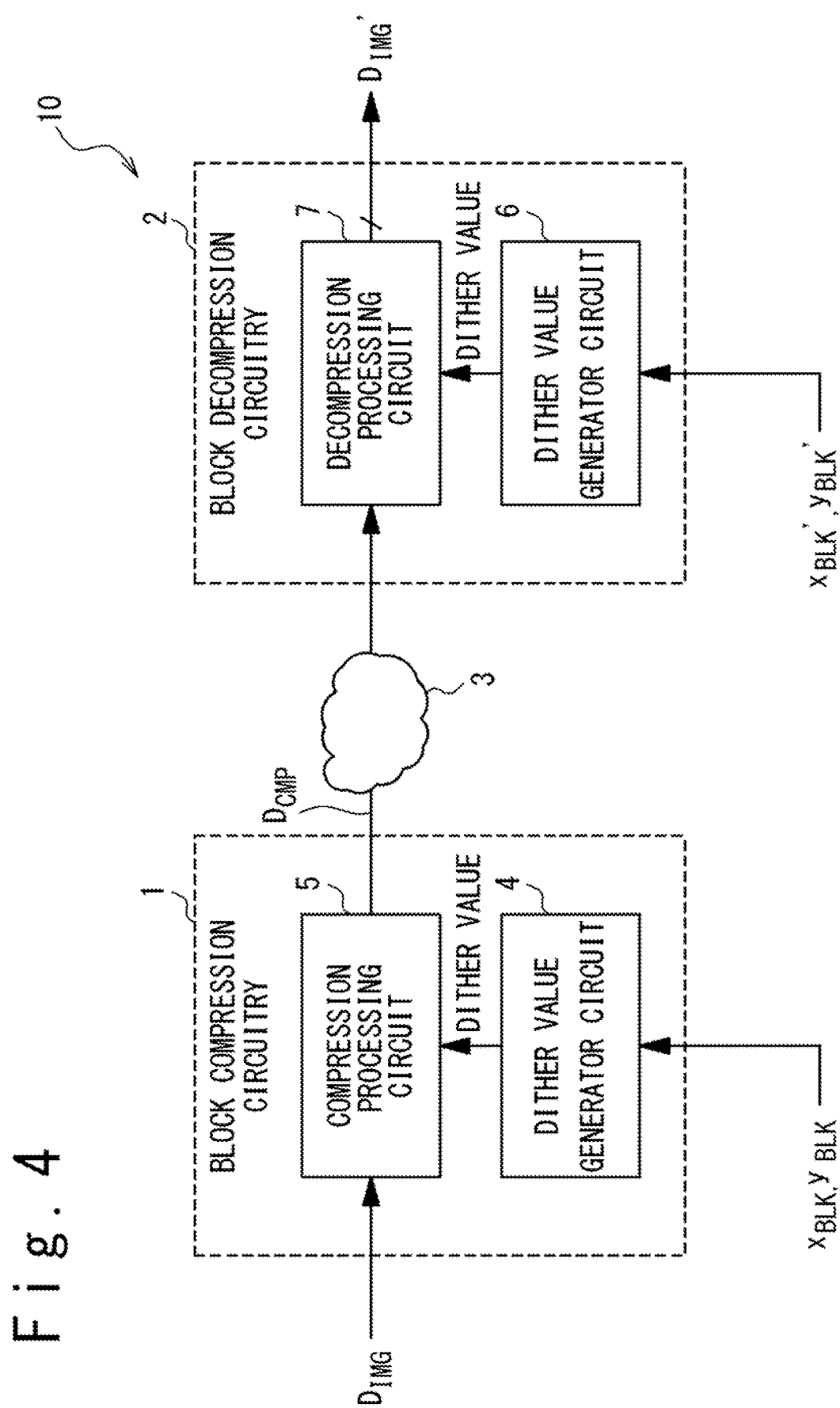
FIG. 4 is a block diagram illustrating the configuration of an image compression and decompression system in one embodiment.

FIG. 4 is a block diagram illustrating an exemplary configuration of an image compression and decompression system 10 in one embodiment. The image compression and decompression system 10 includes a block compression circuitry 1 and a block decompression circuitry 2. The block compression circuitry 1 operates as an image compression device which generates compressed image data $D_{CMP}$ by performing a block compression process on image data $D_{IMG}$. The block compression process referred herein means a compression process in which image data are compressed in units of blocks; when an image data $D_{IMG}$ associated with a certain block are compressed, information of adjacent blocks (including image data $D_{IMG}$ associated with the adjacent blocks) is not referred to. The compressed image data $D_{CMP}$ are transferred to the block decompression circuitry 2 via a given transfer route 3. The block decompression circuitry 2 operates as an image decompression device which generates decompressed image data $D_{IMG}'$ by performing a decompression process adapted to the block compression process on the received compressed image data $D_{CMP}$.

This configuration is intended to reduce the data amount of the image data existing in the transfer route 3. When the transfer route 3 includes a memory, use of the image compression and decompression system 10 of the present embodiment allows reducing the data amount of image data stored in the memory, that is, reducing the capacity of the memory. When the block compression circuitry 1 and the block decompression circuitry 2 are integrated in two separate semiconductor integrated circuits, the transfer route 3 may include a transmission line connected between the two semiconductor integrated circuits. In this case, use of the image compression and decompression system 10 of the present embodiment can allow reducing the data amount of image data to be transferred over the transmission line.

The block compression circuitry 1 includes a dither value generator circuit 4 and a compression processing circuit 5. The dither value generator circuit 4 receives block coordinates $x_{BLK}$ and $y_{BLK}$ of a block for which a compression process is to be done by the block compression circuitry 1 and generates dither values in response to the block coordinates $x_{BLK}$ and $y_{BLK}$.

It should be noted that the block coordinates $x_{BLK}$ and $y_{BLK}$ of a block indicates the position of the block in the image. More specifically, the block coordinate $x_{BLK}$ indicates the position of the block in the horizontal direction in the image, and the block coordinate $y_{BLK}$ indicates the position of the block in the vertical direction in the image. The compression processing circuit 5, when receiving an image data $D_{IMG}$ associated with a certain block, generates a compressed image data $D_{CMP}$ associated with the block by performing a block compression process on the image data $D_{IMG}$ associated with the block. In the compression process performed in the compression processing circuit 5, a quantization process is performed and dither values supplied from the dither value generator circuit 4 are used in the quantization process. In other words, in a compression process performed on an image data $D_{IMG}$ associated with a block, a quantization process is performed using dither values generated in response to the block coordinates $x_{BLK}$ and $y_{BLK}$ of the block.

The block decompression circuitry 2 includes a dither value generator circuit 6 and a decompression processing circuit 7. The dither value generator circuit 6 receives block coordinates $x_{BLK}'$ and $y_{BLK}'$ of a block for which a decompression process is to be done by the block decompression circuitry 2 and generates dither values in response to the block coordinates $x_{BLK}'$ and $y_{BLK}'$. It should be noted that the block coordinates $x_{BLK}'$ and $y_{BLK}'$ of a block indicates the position of the block in the image. More specifically, the block coordinate $x_{BLK}'$ indicates the position of the block in the horizontal direction in the image, and the block coordinate $y_{BLK}'$ indicates the position of the block in the vertical direction in the image. The decompression processing circuit 7, when receiving a compressed image data $D_{CMP}$ associated with a certain block, generates a decompressed image data $D_{CMP}'$ associated with the block by performing a decompression process on the compressed image data $D_{CMP}$ associated with the block. In the decompression process performed in the decompression processing circuit 7, an inverse quantization process is performed and dither values supplied from the dither value generator circuit 6 are used in the inverse quantization process. In other words, in a decompression process performed on an image data $D_{CMP}$ associated with a block, an inverse quantization process is performed using dither values generated in response to the block coordinates $x_{BLK}'$ and $y_{BLK}'$ of the block.

It should be noted that block coordinates ($x_{BLK}$, $y_{BLK}$ or $x_{BLK}'$, $y_{BLK}'$) are separately supplied to the block compression circuitry 1 and the block decompression circuitry 2, because timing at which the compression process is performed on a certain block may be different from timing at which the decompression process is performed on the block.

Figure 5:
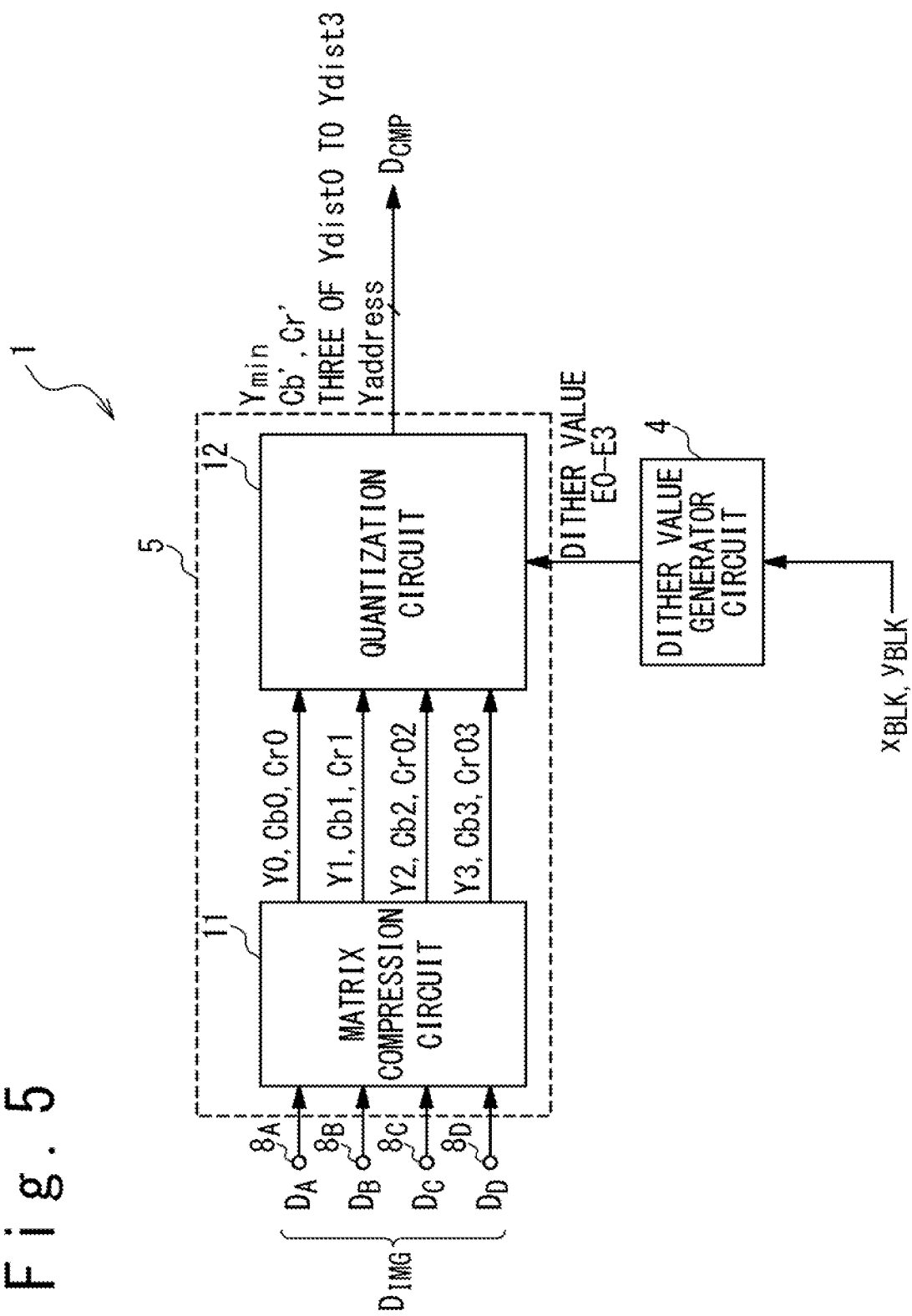
FIG. 5 is a block diagram illustrating one example of the configuration of a compression processing circuit of a block compression circuitry.

FIG. 5 is a block diagram illustrating one example of the configuration of the compression processing circuit 5 of the block compression circuitry 1. In one embodiment, the compression processing circuit 5 includes a matrix compression circuit 11 and a quantization circuit 12. In the present embodiment, image data $D_{IMG}$ supplied to the compression processing circuit 5 are described in the RGB format and include image data $D_A$, $D_B$, $D_C$ and $D_D$ associated with pixels A, B, C and D. In detail, the image data $D_A$ associated with pixel A includes an R data $R_A$ indicating the grayscale value of the red color of pixel A, a G data $G_A$ indicating the grayscale value of the green color and a B data $B_A$ indicating the grayscale value of the blue color and the image data $D_B$ associated with pixel B includes an R data $R_B$ indicating the grayscale value of the red color of pixel B, a G data $G_B$ indicating the grayscale value of the green color and a B data $B_B$ indicating the grayscale value of the blue color. Correspondingly, the image data $D_C$ associated with pixel C includes an R data $R_C$ indicating the grayscale value of the red color of pixel C, a G data $G_C$ indicating the grayscale value of the green color and a B data $B_C$ indicating the grayscale value of the blue color and the image data $D_D$ associated with pixel D includes an R data $R_D$ indicating the grayscale value of the red color of pixel D, a G data $G_D$ indicating the grayscale value of the green color and a B data $B_D$ indicating the grayscale value of the blue color.

The compression processing circuit 5 illustrated in FIG. 5 includes inputs $8_A$, $8_B$, $8_C$ and $8_D$ for externally receiving the image data $D_A$, $D_B$, $D_C$ and $D_D$, respectively; the image data $D_A$, $D_B$, $D_C$ and $D_D$ are supplied to the inputs $8_A$, $8_B$, $8_C$ and $8_D$, respectively. It should be noted that, in this configuration, it is unnecessary to supply addresses indicating the respective pixels in each block to the compression processing circuit 5, because the association of image data with pixels is physically determined by the circuit configuration.

The matrix compression circuit 11 performs RGB-YCbCr conversion on each of the image data $D_A$, $D_B$, $D_C$ and $D_D$ to calculate a luminance data Y, color difference data Cb and Cr for each of pixels A, B, C and D.

The quantization circuit 12 generates the compressed image data $D_{CMP}$ from the luminance data Y, the color difference data Cb and Cr of pixels A, B, C and D. A quantization process is performed in generating the compressed image data $D_{CMP}$ and dither values E0 to E3 received from the dither value generator circuit 4 are used in the quantization process. The dither values E0, E1, E2 and E3 are associated with pixels A, B, C and D of the block for which the compression process is to be done in the block compression circuitry 1 (which may be referred to as "compression target block", hereinafter) and calculated from the block coordinates $x_{BLK}$ and $y_{BLK}$ of the compression target block. A detailed description will be given later of the generation of the compressed image data $D_{CMP}$.

Figure 6:
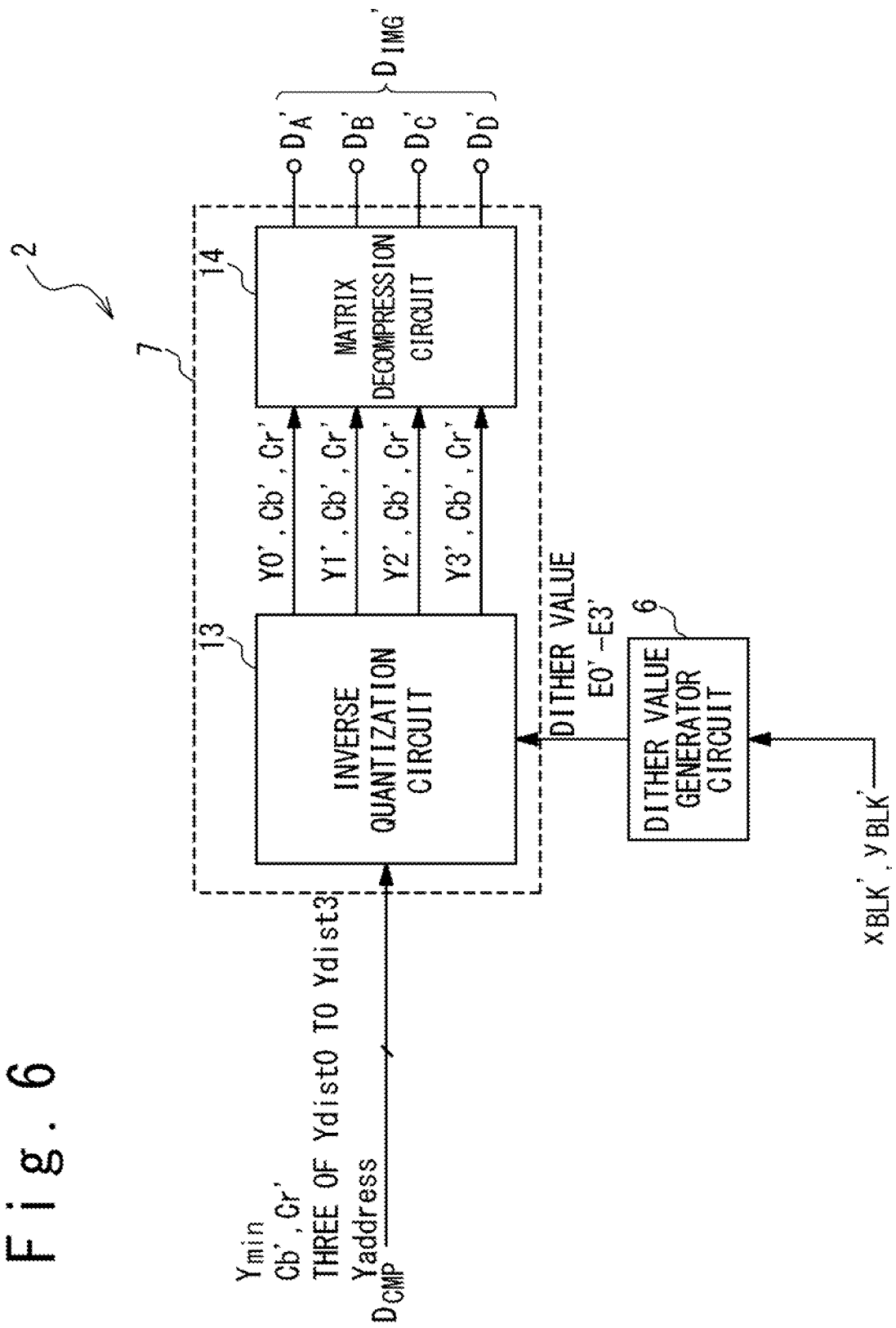
FIG. 6 is a block diagram illustrating one example of the configuration of a decompression processing circuit of a block decompression circuitry.

FIG. 6 is a block diagram illustrating one example of the configuration of the decompression processing circuit 7 of the block decompression circuitry 2. In one embodiment, the decompression processing circuit 7 includes an inverse quantization circuit 13 and a matrix decompression circuit 14. The inverse quantization circuit 13 performs an inverse quantization process on the compressed image data $D_{CMP}$ to reproduce the luminance data Y and the color difference data Cb and Cr for each of pixels A, B, C and D. In FIG. 6, symbols Y0', Y1', Y2' and Y3' denote the reproduced, luminance data Y of pixels A, B, C and D, respectively and symbols Cb' and Cr' denote the reproduced color difference data Cb and Cr of pixels A, B, C and D. A detailed description will be given later of the generation of the luminance data Y0', Y1', Y2' and Y3' and the color difference data Cb' and Cr'.

Dither values E0' to E3' received from the dither value generator circuit 6 are used in the inverse quantization process in the inverse quantization circuit 13. The dither values E0', E1', E2' and E3' are associated with pixels A, B, C and D of the block for which the decompression process is to be done in the block decompression circuitry 2 (which may be referred to as "decompression target block", hereinafter) and calculated from the block coordinates $x_{BLK}'$ and $y_{BLK}'$ of the decompression target block.

The matrix decompression circuit 14 generates the decompressed image data $D_{IMG}'$ by performing YCbCr-RGB conversion on the luminance data Y and the color difference data Cb and Cr of pixels A, B, C and D, which are reproduced by the inverse quantization circuit 13. In the present embodiment, the decompressed image data $D_{IMG}'$ include the image data $D_A'$, $D_B'$, $D_C'$ and $D_D'$ of pixels A, B, C and D, and each of the image data $D_A'$, $D_B'$, $D_C'$ and $D_D'$ includes an R data indicating the grayscale values of the red color, a G data indicating the grayscale values of the green color, and B a data indicating the grayscale values of the blue color.

Next, a detailed description is given of the block compression process performed by the block compression circuitry 1 and the block decompression process performed by the block decompression circuitry 2.

(Block Compression Process)

When the block compression process is performed on an image data $D_{IMG}$ associated with a certain compression target block, the image data $D_{IMG}$ associated with the compression target block are supplied to the matrix compression circuit 11. The matrix compression circuit 11 performs RGB-YCbCr conversion on each of the image data $D_A$, $D_B$, $D_C$ and $D_D$ included in the image data $D_{IMG}$ to calculate a luminance data Y and color difference data Cb and Cr for each of pixels A, B, C and D.

In one embodiment, the matrix $M_1$ defined by the following expression (1) is used in the RGB-YCbCr conversion in the matrix compression circuit 11:

$$M_1 = \begin{pmatrix} 1 & 2 & 1 \\ 0 & -1 & 1 \\ 1 & -1 & 0 \end{pmatrix}. \quad (1)$$

In this case, the luminance data Y and the color difference data Cb and Cr of pixels A, B, C and D are calculated in accordance with the following expressions (2a) to (2d):

$$\begin{pmatrix} Y0 \\ Cb0 \\ Cr0 \end{pmatrix} = \begin{pmatrix} 1 & 2 & 1 \\ 0 & -1 & 1 \\ 1 & -1 & 0 \end{pmatrix} \begin{pmatrix} R_A \\ G_A \\ B_A \end{pmatrix}, \quad (2a)$$

$$\begin{pmatrix} Y1 \\ Cb1 \\ Cr1 \end{pmatrix} = \begin{pmatrix} 1 & 2 & 1 \\ 0 & -1 & 1 \\ 1 & -1 & 0 \end{pmatrix} \begin{pmatrix} R_B \\ G_B \\ B_B \end{pmatrix}, \quad (2b)$$

$$\begin{pmatrix} Y2 \\ Cb2 \\ Cr2 \end{pmatrix} = \begin{pmatrix} 1 & 2 & 1 \\ 0 & -1 & 1 \\ 1 & -1 & 0 \end{pmatrix} \begin{pmatrix} R_C \\ G_C \\ B_C \end{pmatrix}, \text{ and} \quad (2c)$$

$$\begin{pmatrix} Y3 \\ Cb3 \\ Cr3 \end{pmatrix} = \begin{pmatrix} 1 & 2 & 1 \\ 0 & -1 & 1 \\ 1 & -1 & 0 \end{pmatrix} \begin{pmatrix} R_D \\ G_D \\ B_D \end{pmatrix}, \quad (2d)$$

where Y0, Cb0, Cr0 are the luminance data Y and the color difference data Cb and Cr of pixel A, respectively, Y1, Cb1, Cr1 are the luminance data Y and the color difference data Cb and Cr of pixel B, respectively, Y2, Cb2, Cr2 are the luminance data Y and the color difference data Cb and Cr of pixel C, respectively, and Y3, Cb3, Cr3 are the luminance data Y and the color difference data Cb and Cr of pixel D, respectively. The calculated luminance data Y and color difference data Cb and Cr of pixels A, B, C and D are supplied to the quantization circuit 12.

In parallel, dither values E0, E1, E2 and E3 associated with pixels A, B, C and D of the compression target block are generated on the basis of the block coordinates $x_{BLK}$ and $y_{BLK}$ of the compression target block, and supplied to the quantization circuit 12. In one embodiment, the dither values E0, E1, E2 and E3 are generated from pseudo-random numbers which are generated by using the coordinates of pixels A, B, C and D of the compression target block as seed values. For example, the dither value E0 associated with pixel A is generated as the lower n bits of the pseudo-random number V0 obtained by the following expression (3a) for n being an integer of two or more which is equal to the number of bits of the dither value required in the quantization process:

$$V0 = 77 \times x_A + 139 \times y_A, \tag{3a}$$

where $x_A$ is the coordinate indicating the position of pixel A of the compression target block in the horizontal direction of the image, and $y_A$ is the coordinate indicating the position of pixel A of the compression target block in the vertical direction of the image. It should be noted that the coordinates $x_A$ and $y_A$ of pixel A can be determined from the block coordinates $x_{BLK}$ and $y_{BLK}$ of the compression target block, since the position of pixel A in the compression target block is determined by definition. The above-described expression (3a) is a simplified expression used for generating a pseudo-random number from the coordinates $x_A$ and $y_A$.

Similarly, the dither values E1, E2 and E3 respectively associated with pixels B, C and D are generated as the lower n bits of the pseudo-random numbers V1, V2 and V3 obtained by the following expressions (3b), (3c) and (3d), respectively:

$$V1 = 77 \times x_B + 139 \times y_B, \tag{3b}$$

$$V2 = 77 \times x_C + 139 \times y_C, \text{ and} \tag{3c}$$

$$V3 = 77 \times x_D + 139 \times y_D, \tag{3d}$$

where $x_B$ is the coordinate indicating the position of pixel B of the compression target block in the horizontal direction of the image, $y_B$ is the coordinate indicating the position of pixel B of the compression target block in the vertical direction of the image, $x_C$ is the coordinate indicating the position of pixel C of the compression target block in the horizontal direction of the image, $y_C$ is the coordinate indicating the position of pixel C of the compression target block in the vertical direction of the image, $x_D$ is the coordinate indicating the position of pixel D of the compression target block in the horizontal direction of the image, and $y_D$ is the coordinate indicating the position of pixel D of the compression target block in the vertical direction of the image. The coordinates $x_B$, $y_B$, $x_C$, $y_C$, $x_D$ and $y_D$ of pixels B, C and D can be also determined from the block coordinates $x_{BLK}$ and $y_{BLK}$ of the compression target block. It should be noted that the simplified expressions used for generating the pseudo-random numbers V0 to V3 may be variously modified.

The quantization circuit 12 generates compressed image data $D_{CMP}$ from the luminance data Y, color difference data Cb and Cr associated with pixels A, B, C and D, which are received from the matrix compression circuit 11. In one embodiment, the compression image data $D_{CMP}$ associated with the compression target block include a minimum value data Ymin, averaged color reference data Cb', Cr', three of luminance difference data Ydist0 to Ydist3 and an address data Yaddress. The above-described dither values E0 to E3 are used in the quantization process performed in calculating the luminance difference data Ydist0 to Ydist3 of the compressed imaged data $D_{CMP}$.

In one embodiment, the minimum value data Ymin, the averaged color difference data Cb', Cr', the luminance difference data Ydist0 to Ydist3 and the address data Yaddress are generated through the procedure described below.

The minimum value data Ymin is determined as one of the luminance data Y0 to Y3 of pixels A to D, which one has the smallest value. When Y0 has the smallest value of the luminance data Y0 to Y3, for example, the luminance data Y0 is selected as the minimum value data Ymin.

The averaged color difference data Cb' is calculated by calculating the sum of the color difference data Cb of pixels A, B, C and D and truncating the lower two bits of the calculated sum (that is, dividing the sum by four). Similarly, the averaged color difference data Cr' is calculated by calculating the sum of the color difference data Cr of pixels A, B, C and D and truncating the lower two bits of the calculated sum (that is, dividing the sum by four).

The luminance difference data Ydist0 to Ydist3 are calculated by performing a quantization process on the differences obtained by subtracting the minimum value data Ymin from the luminance data Y0 to Y3, respectively. More specifically, the luminance difference data Ydist0 to Ydist3 are calculated as follows:

The luminance difference data Ydist0 is obtained by a quantization process which involves: calculating the difference Y0−Ymin which is obtained by subtracting the minimum value data Ymin from the luminance data Y0, calculating the sum of the difference Y0−Ymin and the dither value E0, and truncating the lower m bits of the obtained sum Y0−Ymin+E0. In other words, the luminance difference data Ydist0 is calculated in accordance with the following expression (4a):

$$Y\text{dist}0 = (Y0 - Y\text{min} + E0) >> m, \tag{4a}$$

where ">>m" is an operator indicating a bit truncation of m bits (that is, an m-bit right shift).

Similarly, the luminance difference data Ydist1 to Ydist3 are calculated in accordance with the following expressions (4b) to (4d):

$$Y\text{dist}1 = (Y1 - Y\text{min} + E1) >> m, \tag{4b}$$

$$Y\text{dist}2 = (Y2 - Y\text{min} + E2) >> m, \text{ and} \tag{4c}$$

$$Y\text{dist}3 = (Y3 - Y\text{min} + E3) >> m. \tag{4d}$$

The compressed image data $D_{CMP}$ associated with a compression target block include three of the luminance difference data Ydist0 to Ydist3 which three are calculated from three of the luminance data Y0 to Y3 other than the one having the smallest value. When the luminance data Y0 has the smallest value of the luminance data Y0 to Y3, for example, the compressed image data $D_{CMP}$ include the luminance difference data Ydist1 to Ydist3 (other than the luminance difference data Ydist0).

The address data Yaddress is generated as a data indicating which of pixels A to D has the smallest luminance data (that is, which of the luminance data Y0 to Y3 has the smallest value). When the luminance data Y0 has the smallest value of the luminance data Y0 to Y3, for example, the address data Yaddress is generated to include information indicating that the luminance data Y0 of pixel A has the smallest value.

The compressed image data $D_{CMP}$ includes the minimum value data Ymin, the averaged color difference data Cb', Cr', three of the luminance difference data Ydist0 to Ydist3 and the address data Yaddress, which are generated as described above. The block compression process is completed through the procedure described above.

(Block Decompression Process)

When a block decompression process is performed for a decompression target block, the compressed image data $D_{CMP}$ associated with the decompression target block is supplied to the inverse quantization circuit 13. In parallel, dither values E0', E1', E2' and E3' associated with pixels A, B, C and D of the decompression target block are generated by the dither value generator circuit 6 on the basis of the block coordinates $x_{BLK}'$ and $y_{BLK}'$ of the decompression target block, and supplied to the inverse quantization circuit 13.

The dither values E0', E1', E2' and E3' are generated by the dither value generator circuit 6 in a similar manner to the dither values E0, E1, E2 and E3 which are generated by the dither value generator circuit 4, except for that the block coordinates $x_{BLK}'$ and $y_{BLK}'$ of the decompression target block are used in place of the block coordinates $x_{BLK}$ and $y_{BLK}$ of the compression target block. In one embodiment, the dither values E0', E1', E2' and E3' are generated from pseudo-random numbers which are generated by using the coordinates of pixels A, B, C and D of the decompression target block as seed values. For example, the dither values E0', E1', E2' and E3' associated with pixels A, B, C and D are generated as the lower n bits of pseudo-random numbers V0' to V3' obtained by the following expressions (5a) to (5d), respectively:

$$V0' = 77 \times x_A' + 139 \times y_A', \quad (5a)$$

$$V1' = 77 \times x_B' + 139 \times y_B', \quad (5b)$$

$$V2' = 77 \times x_C' + 139 \times y_C', \text{ and} \quad (5c)$$

$$V3' = 77 \times x_D' + 139 \times y_D', \quad (5d)$$

where $x_A'$ is the coordinate indicating the position of pixel A of the decompression target block in the horizontal direction of the image, $y_A'$ is the coordinate indicating the position of pixel A of the decompression target block in the vertical direction of the image, $x_B'$ is the coordinate indicating the position of pixel B of the decompression target block in the horizontal direction of the image, $y_B'$ is the coordinate indicating the position of pixel B of the decompression target block in the vertical direction of the image, $x_C'$ is the coordinate indicating the position of pixel C of the decompression target block in the horizontal direction of the image, $y_C'$ is the coordinate indicating the position of pixel C of the decompression target block in the vertical direction of the image, $x_D'$ is the coordinate indicating the position of pixel D of the decompression target block in the horizontal direction of the image, and $y_D'$ is the coordinate indicating the position of pixel D of the decompression target block in the vertical direction of the image. It should be noted that the coordinates $x_A'$, $y_A'$, $x_B'$, $y_B'$, $x_C'$, $y_C'$, $x_D'$, and $y_D'$ of pixels A, B, C and D can be determined from the block coordinates $x_{BLK}'$ and $y_{BLK}'$ of the decompression target block, since the positions of pixels A, B, C and D in the decompression target block are determined by definition. The above-described expressions (5a) to (5d) are simplified expressions used for generating pseudo-random numbers V0' to V3' from the coordinates $x_A'$, $y_A'$, $x_B'$, $y_B'$, $x_B'$, $y_C'$, $x_D'$ and $y_D'$. It should be noted that the simplified expressions used for the generation of the pseudo-random numbers V0' to V3' may be variously modified.

The inverse quantization circuit 13 reproduces the luminance data Y and color difference data Cb and Cr of pixels A, B, C and D from the compressed image data $D_{CMP}$. The reproduction of the luminance data Y and color difference data Cb and Cr of pixels A, B, C and D are achieved as described below.

In the decompression process, the averaged color difference data Cb' and Cr' included in the compressed image data $D_{CMP}$ are used as the color difference data Cb and Cr for all of pixels A, B, C and D without change.

The luminance data Y0', Y1', Y2' and Y3' of pixels A, B, C and D are, on the other hand, reproduced from the minimum value data Ymin, the three of the luminance difference data Ydist0 to Ydist3 and the address data Yaddress which are included in the compressed image data $D_{CMP}$, as described in the following.

The inverse quantization circuit 13 determines the minimum value data Ymin included in the compressed image data $D_{CMP}$ as the luminance data of the pixel indicated by the address data Yaddress. When the address data Yaddress indicates that the luminance data of pixel A is the smallest of those of pixels A, B, C and D, for example, the inverse quantization circuit 13 determines that the minimum value data Ymin as the luminance data Y0' of pixel A. When the address data Yaddress indicates that the luminance data of a different pixel is the smallest, the inverse quantization circuit 13 determines the luminance data of the different pixel in a similar manner.

The luminance data of the remaining three pixels are reproduced from the minimum data Ymin and data obtained by performing an inverse quantization process on the three luminance difference data included in the compressed image data $D_{CMP}$ (that is, the three of the luminance difference data Ydist0 to Ydist3).

More specifically, the luminance data of the remaining three pixels are calculated from three of the following expressions (6a) to (6d) associated with the three remaining pixels:

$$Y0' = Ydist0 << m - E0' + Ymin, \quad (6a)$$

$$Y1' = Ydist1 << m - E1' + Ymin, \quad (6b)$$

$$Y2' = Ydist2 << m - E2' + Ymin, \text{ and} \quad (6c)$$

$$Y3' = Ydist3 << m - E3' + Ymin, \quad (6d)$$

where expressions (6a), (6b), (6c) and (6d) are used for calculating the luminance data Y0', Y1', Y2' and Y3', respectively. The operator "<<m" recited in expressions (6a) to (6d) is an operator which indicates the left shift of m bits.

When the address data Yaddress indicates that the luminance data of pixel A is the smallest, for example, the compressed image data $D_{CMP}$ includes the luminance difference data Ydist1 to Ydist3 and the luminance data Y1', Y2' and Y3' of pixels B, C and D (the pixels other than pixel A) are reproduced in accordance with expressions (6b) to (6d). When the address data Yaddress indicates that the luminance data of a different pixel is the smallest, the luminance data of the remaining three pixels are reproduced in a similar manner. The luminance data Y0' to Y3' of pixels A to D of the decompression target block are reproduced through the above-described procedure.

The luminance data Y0' to Y3' of pixels A to D of the decompression target block and the color difference data commonly used for pixels A to D (the averaged color difference data Cb' and Cr') obtained as described above are supplied to the matrix decompression circuit 14. The matrix decompression circuit 14 performs YCbCr-RGB conversion on the luminance data Y0' to Y3' and color difference data of pixels A, B, C and D to generate the decompressed image data $D_{IMG}'$.

In one embodiment, a matrix $M_2$ defined by the following expression (7) is used for the YCbCr-RGB conversion in the matrix decompression circuit 14:

$$M_2 = \begin{pmatrix} 1 & -1 & 3 \\ 1 & -1 & -1 \\ 1 & 3 & -1 \end{pmatrix} \quad (7)$$

In this case, the R, G and B data of the image data DA', DB', DC' and DD' of pixels A, B, C and D are calculated in accordance with the following expressions (8a) to (8d):

$$\begin{pmatrix} R'_A \\ G'_A \\ B'_A \end{pmatrix} = \begin{pmatrix} 1 & -1 & 3 \\ 1 & -1 & -1 \\ 1 & 3 & -1 \end{pmatrix} \begin{pmatrix} Y0' \\ Cb' \\ Cr' \end{pmatrix}, \quad (8a)$$

$$\begin{pmatrix} R'_B \\ G'_B \\ B'_B \end{pmatrix} = \begin{pmatrix} 1 & -1 & 3 \\ 1 & -1 & -1 \\ 1 & 3 & -1 \end{pmatrix} \begin{pmatrix} Y1' \\ Cb' \\ Cr' \end{pmatrix}, \quad (8b)$$

$$\begin{pmatrix} R'_C \\ G'_C \\ B'_C \end{pmatrix} = \begin{pmatrix} 1 & -1 & 3 \\ 1 & -1 & -1 \\ 1 & 3 & -1 \end{pmatrix} \begin{pmatrix} Y2' \\ Cb' \\ Cr' \end{pmatrix}, \text{ and} \quad (8c)$$

$$\begin{pmatrix} R'_D \\ G'_D \\ B'_D \end{pmatrix} = \begin{pmatrix} 1 & -1 & 3 \\ 1 & -1 & -1 \\ 1 & 3 & -1 \end{pmatrix} \begin{pmatrix} Y3' \\ Cb' \\ Cr' \end{pmatrix}, \quad (8d)$$

where $R_A'$, $G_A'$ and $B_A'$ are the R, G, and B data included in the image data $D_A'$ of pixel A, $R_B'$, $G_B'$ and $B_B'$ are the R, G, and B data included in the image data $D_B'$ of pixel B, $R_C'$, $G_C'$ and $B_C'$ are the R, G, and B data included in the image data $D_C'$ of pixel C, and $R_D'$, $G_D'$ and $B_D'$ are the R, G, and B data included in the image data $D_D'$ of pixel D.

The decompressed image data $D_{IMG}'$ of the decompression target block is generated to include the thus-calculated image data $D_A'$, $D_B'$, $D_C'$ and $D_D'$ of pixels A, B, C and D. This completes the block decompression processing.

Figure 7:
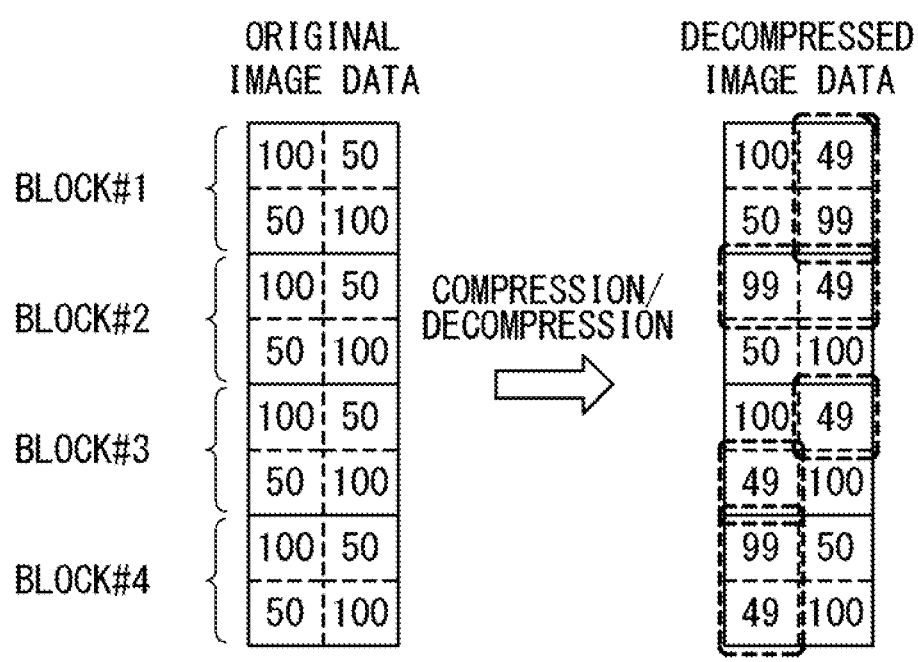
FIG. 7 schematically illustrates image quality deterioration caused by block compression and decompression processes in the present embodiment.

One advantage of the above-described block compression and decompression processes of the present embodiment is reduction in the image quality deterioration. The block compression and decompression processes of the present embodiment allows distributing the positions of pixels experiencing errors caused by the compression and decompression processes in the respective blocks over the image, since the dither values generated depending on the positions of the compression and decompression target blocks are used in the quantization process and the inverse quantization process. Discussed in the following is an example illustrated in the left part of FIG. 7, in which the grayscale values of pixels A, B, C and D indicated by the original image data associated with blocks #1 to #4 arrayed in one column are 100, 50, 50 and 100, for all of the red (R), green (G) and blue (B) colors. When the compression process and decompression process are performed on the image data of blocks #1 to #4, pixels at different positions experience errors in the decompressed image data of blocks #1 to #4, since the dither values are generated depending on the positions of the blocks. In the example illustrated in FIG. 7, pixels B and D experience errors in block #1 and pixels A and B experience errors in block #2. Furthermore, pixels B and C experience errors in block #3 and pixels A and C experience errors in block #4. In this case, as is understood from the right part of FIG. 7, an observer does not observe a dark line as illustrated in the right part of FIG. 3, since there is no column of pixels of low (or high) luminance. As discussed, the block compression and decompression processes of the present embodiment effectively reduce image quality deterioration caused by the block compression.

In the following, a description is given of variations of the image compression and decompression system of the present embodiment.

Figure 8:
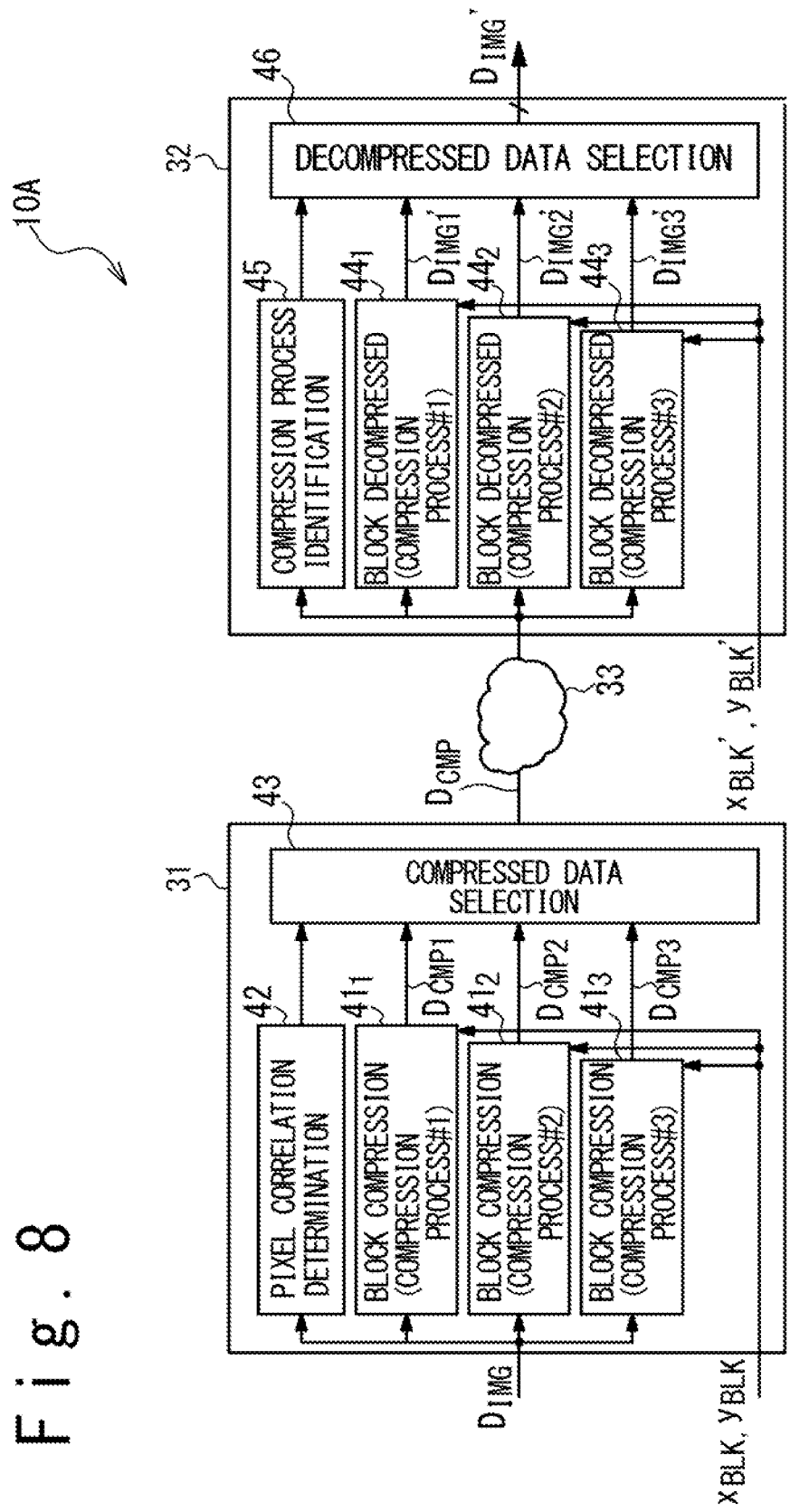
FIG. 8 is a block diagram illustrating the configuration of an image compression and decompression system in another embodiment.

FIG. 8 is a block diagram illustrating the configuration of an image compression and decompression system 10A in another embodiment. The image compression and decompression system 10A illustrated in FIG. 8 is configured to select a compression process used for block compression of an image data of each block in response to a feature of the image data of each block, for example, the correlation (likelihood) among the image data of pixels of each block. Such operation effectively reduces compression distortion, since an appropriate compression process can be selected in accordance with the feature of the image data of each block.

More specifically, the image compression and decompression system 10A includes a block compression circuitry 31 and a block decompression circuitry 32. The block compression circuitry 31 and the block decompression circuitry 32 are connected via a transfer route 33. When the block compression circuitry 31 and the block decompression circuitry 32 are integrated in the same semiconductor integrated circuit, the transfer route may include a memory. In this configuration, the block compression circuitry 31 is used for performing compression processing for reducing the data amount of image data stored in the memory. When the block compression circuitry 31 and the block decompression circuitry 32 are integrated in different two semiconductor integrated circuits, the transfer route may include a transmission line which connects the two semiconductor integrated circuits.

The block compression circuitry 31 is configured as an image compression device which performs block compression on the image data $D_{IMG}$ supplied thereto to generate compressed image data $D_{CMP}$. The block compression circuitry 31 includes block compression circuits $41_1$ to $41_3$, a pixel correlation determination circuit 42 and a compressed data selection circuit 43.

The block compression circuits $41_1$ to $41_3$ perform different block compression processes on the image data $D_{IMG}$ to generate compressed image data $D_{CMP1}$ to $D_{CMP3}$, respectively. In detail, the block compression circuit $41_1$ is configured to achieve block compression by performing a first compression process (compression process #1) on the image data $D_{IMG}$ to generate the compressed image data $D_{CMP1}$. Similarly, the block compression circuit $41_2$ is configured to achieve block compression by performing a second compression process (compression process #2) on the image data $D_{IMG}$ to generate the compressed image data $D_{CMP2}$ and the block compression circuit $41_3$ is configured to achieve block compression by performing a third compression process (compression process #3) on the image data $D_{IMG}$ to generate the compressed image data $D_{CMP3}$. Compression processes #1 to #3 are different from one another.

The block compression circuits $41_1$ to $41_3$ are configured and operated similarly to the block compression circuitry 1 illustrated in FIG. 4 except for that the block compression circuits $41_1$ to $41_3$ achieve block compression through different compression processes from one another. Specifically, the block compression circuits $41_1$ to $41_3$ each receive the block coordinates $x_{BLK}$ and $y_{BLK}$ of the compression target block and include a dither value generator circuit (not illustrated in FIG. 8) which generates dither values used for the quantization process. The dither values used for the quantization process performed in each of the block compression circuits $41_1$ to $41_3$ are generated by the dither value generator circuit from the block coordinates $x_{BLK}$ and $y_{BLK}$ of the compression target block.

The pixel correlation determination circuit 42 determines the correlation among the image data of the pixels of the compression target blocks and supplies to the compressed data selection circuit 43 a selection data indicating which of compression processes #1 to #3 is to be selected on the basis of the determined correlation. The compressed data selection circuit 43 selects the compressed image data $D_{CMP}$ to be finally used from among the compressed image data $D_{CMP1}$ to $D_{CMP3}$ received from the block compression circuits $41_1$ to $41_3$.

The block decompression circuitry 32 is configured as an image decompression device which generates decompressed image data $D_{IMG}'$ by decompressing the compressed image data $D_{CMP}$. The block decompression circuitry 32 includes block decompression circuits $44_1$ to $44_3$, a compression process identification circuit 45 and a decompressed data selection circuit 46.

The block decompression circuits $44_1$ to $44_3$ perform different block decompression processes on the compressed image data $D_{CMP}$ to generate decompressed image data $D_{IMG}'$ to $D_{IMG}'$, respectively. In detail, the block decompression circuit $44_1$ is configured to achieve block decompression by performing a first decompression process (decompression process #1) on the compressed image data $D_{CMP}$ to generate decompressed image data $D_{IMG1}'$. Similarly, the block decompression circuit $44_2$ is configured to achieve block decompression by performing a second decompression process (decompression process #2) on the compressed image data $D_{CMP}$ to generate decompressed image data $D_{IMG2}'$ and the block decompression circuit $44_3$ is configured to achieve block decompression by performing a third decompression process (decompression process #3) on the compressed image data $D_{CMP}$ to generate decompressed image data $D_{IMG3}'$ The block decompression circuits $44_1$ to $44_3$ are configured and operated similarly to the block decompression circuitry 2 illustrated in FIG. 4 except for that the block decompression circuits $44_1$ to $44_3$ achieve block decompression through different decompression processes from one another. Specifically, the block decompression circuits $44_1$ to $44_3$ each receive the block coordinates $x_{BLK}'$ and $y_{BLK}'$ of the decompression target block and include a dither value generator circuit (not illustrated in FIG. 8) which generates dither values used for the inverse quantization process. The dither values used for the inverse quantization process performed in each of the block decompression circuits $44_1$ to $44_3$ are generated by the dither value generator circuit from the block coordinates $x_{BLK}'$ and $y_{BLK}'$ of the decompression target block.

The compression process identification circuit 45 identifies which of compression processes #1 to #3 is used to generate the compressed image data $D_{CMP}$ and supplies to the decompressed data selection circuit 46 a compression process identification data indicating the compression process used to generate the compressed image data $D_{CMP}$. When the compressed image data $D_{CMP}$ includes a compression process identification data which identifies the compression process used to generate the compressed image data $D_{CMP}$, for example, the compression process identification circuit 45 identifies the compression process used to generate the compressed image data $D_{CMP}$ from the compression process identification data. The decompressed data selection circuit 46 selects the decompressed image data $D_{IMG}'$ to be finally output from the decompressed image data $D_{IMG1}'$ to $D_{IMG3}'$ received from the block decompression circuits $44_1$ to $44_3$ on the basis of the compression process identification data.

Figure 9:
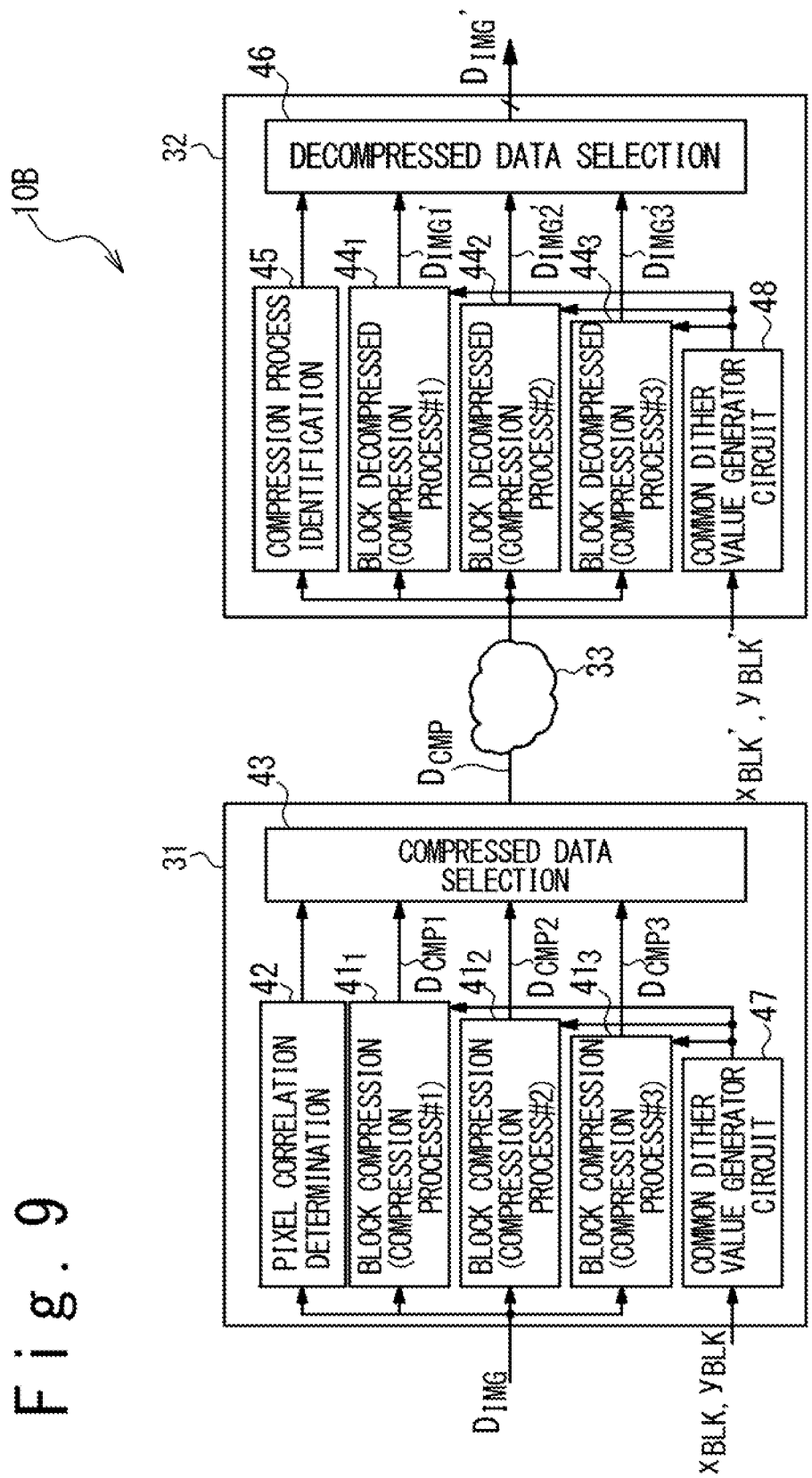
FIG. 9 is a block diagram illustrating the configuration of an image compression and decompression system in still another embodiment.

FIG. 9 is a block diagram illustrating the configuration of an image compression and decompression system 10B in still another embodiment. The image compression and decompression system 10B illustrated in FIG. 9, as is the case with the image compression and decompression system 10A illustrated in FIG. 8, is configured to select a compression process used for block compression of the image data of each block in response to the feature of the image data of each block. There is however a difference in that the block compression circuitry 31 includes a common dither value generator circuit 47 and the block decompression circuitry 32 includes a common dither value generator circuit 48.

The common dither value generator circuit 47 generates common dither values from the block coordinates $x_{BLK}$ and $y_{BLK}$ of the compression target block.

The block compression circuits $41_1$ to $41_3$ each perform a quantization process using the common dither values in the block compression process performed therein. When the number of bits of the common dither values supplied is more than that of bits of dither values used in the quantization process performed in any of the block compression circuits $41_1$ to $41_3$, such block compression circuit performs the quantization process by using some of the bits of the common dither values (for example, upper or lower bits). When a certain block compression circuit 41 uses two-bit dither values in the quantization process performed therein, for example, the block compression circuit 41 performs the quantization process by using upper two bits (or lower two bits) of the common dither values generated by the common dither value generator circuit 47.

Similarly, the common dither value generator circuit 48 generates common dither values from the block coordinates $x_{BLK}'$ and $y_{BLK}'$ of the decompression target block. The block decompression circuits $44_1$ to $44_3$ each perform an inverse quantization process by using the common dither values in the block decompression process performed therein. When the number of bits of the common dither values supplied is more than that of bits of dither values used in the inverse quantization process performed in any of the block decompression circuits $44_1$ to $44_3$, such block decompression circuit performs the inverse quantization process by using some of the bits of the common dither values (for example, upper or lower bits). When a certain block decompression circuit 44 uses two-bit dither values in the inverse quantization process performed therein, for example, the block decompression circuit 44 performs the inverse quantization process by using upper two bits (or lower two bits) of the common dither values generated by the common dither value generator circuit 48.

The image compression and decompression system 10B illustrated in FIG. 9 is configured to use the common dither values (or upper/lower bits of common dither values) generated from the block coordinates $x_{BLK}$ and $y_{BLK}$ commonly in the quantization processes performed in the block compression circuits $41_1$ to $41_3$ which perform different compression processes. In the image compression and decompression system 10B, the positions of pixels experiencing errors in the respective blocks are distributed over the image since the common dither values generated in response to the block coordinates $x_{BLK}$ and $y_{BLK}$ are used in the compression processes, although the block compression circuits $41_1$ to $41_3$ performs different compression processes. Additionally, the image compression and decompression system 10B is configured to use an appropriate compression process for each block. Accordingly, the image compression and decompression system 10B suppresses generation of visually perceivable unevenness (or mura) in the image further effectively.

The image compression and decompression systems 10, 10A and 10 of the above-described embodiments may be monolithically integrated in a single semiconductor integrated circuit and used for image data compression and decompression within the semiconductor integrated circuit, for example, image data compression and decompression in a display driver which drives a display panel.

Figure 10:
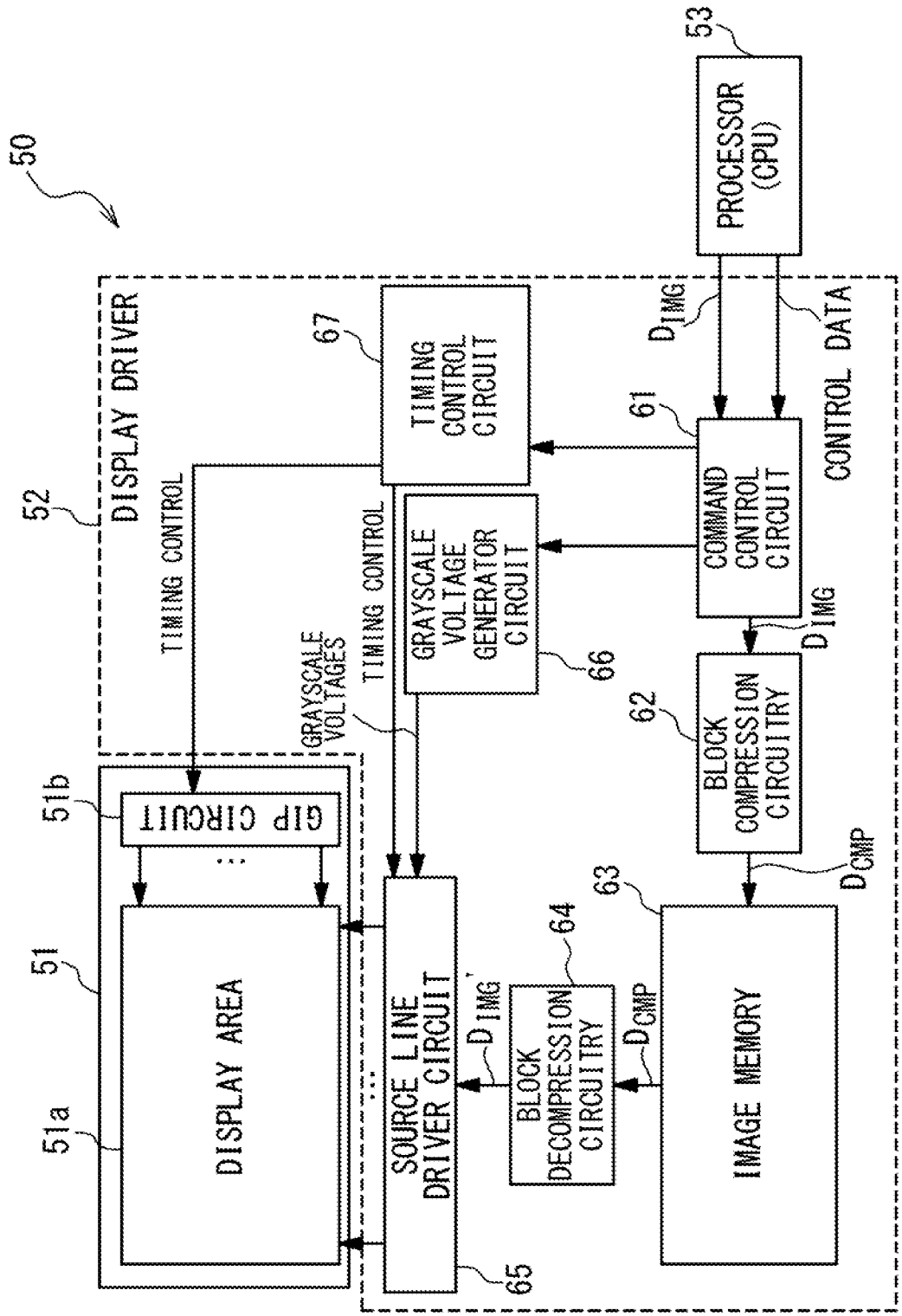
FIG. 10 is a block diagram illustrating an example of the configuration of a display device including a display driver which incorporates the image compression and decompression system of any of the above-described embodiments.

FIG. 10 is a block diagram illustrating an exemplary configuration of a display device 50 including a display driver thus configured. The display device 50 includes a display panel 51 (e.g. a liquid crystal display panel and an OLED display panel) and a display driver 52. The display panel 51 includes a display area 51a and a GIP (gate in panel) circuit 51b. Provided in the display area 51a are pixels, gate lines, and source lines. The GIP circuit 51b drives the gate lines provided in the display area 51a. The display driver 52 drives the source lines of the display panel 51 in response to image data and control data received from a processor 53 (e.g., CPU (central processing unit)) and controls the GIP circuit 51b.

The display driver 52 includes: a command control circuit 61, a block compression circuitry 62, an image memory 63, a block decompression circuitry 64, a source line driver circuit 65, a grayscale voltage generator circuit 66, and a timing control circuit 67.

The command control circuit 61 transfers the image data $D_{IMG}$ received from the processor 53 to the block compression circuitry 62. Additionally, the command control circuit 61 controls respective circuits of the display driver 52, including the grayscale voltage generator circuit 66 and the timing control circuit 67, in response to the control data received from the processor 53.

The block compression circuitry 62 operates as an image compression device which generates compressed image data $D_{CMP}$ by performing a block compression process on the image data $D_{IMG}$ received from the command control circuit 61 and supplies the compressed image data $D_{CMP}$ to the image memory 63. The block compression circuitry (1 or 31) of the above-described image compression and decompression system 10, 10A or 10B is used as the block compression circuitry 62 of the display driver 52 illustrated in FIG. 10.

The image memory 63 stores therein the compressed image data $D_{CMP}$ received from the block compression circuitry 62. The compressed image data $D_{CMP}$ are read out from the image memory 63 and transferred to the block decompression circuitry 64.

The block decompression circuitry 64 operates as an image decompression device which generates decompressed image data $D_{IMG}'$ by performing a block decompression compression on the compressed image data $D_{CMP}$ read out from the image memory 63 and supplies the decompressed image data $D_{IMG}'$ to the source line driver circuit 65.

The source line driver circuit 65 drives the source lines of the display area 51a of the display panel 51 in response to the decompressed image data $D_{IMG}'$. More specifically, The source line driver circuit 65 generates source voltages having voltage levels corresponding to the decompressed image data $D_{IMG}'$ by using grayscale voltages received from the grayscale voltage generator circuit 66 and drives the respective source lines with the source voltages associated thereto.

The grayscale voltage generator circuit 66 generates the grayscale voltages used for the generation of the source voltages and supplies the grayscale voltages to the source line driver circuit 65.

The timing control circuit 67 controls operation timing of the respective circuits of the display driver 52 and the GIP circuit 51b of the display panel 51.

The display driver 52 illustrated in FIG. 10 is configured to compress the image data to be stored in the image memory 63. This configuration effectively reduces the capacity of the image memory 63.

Figure 11:
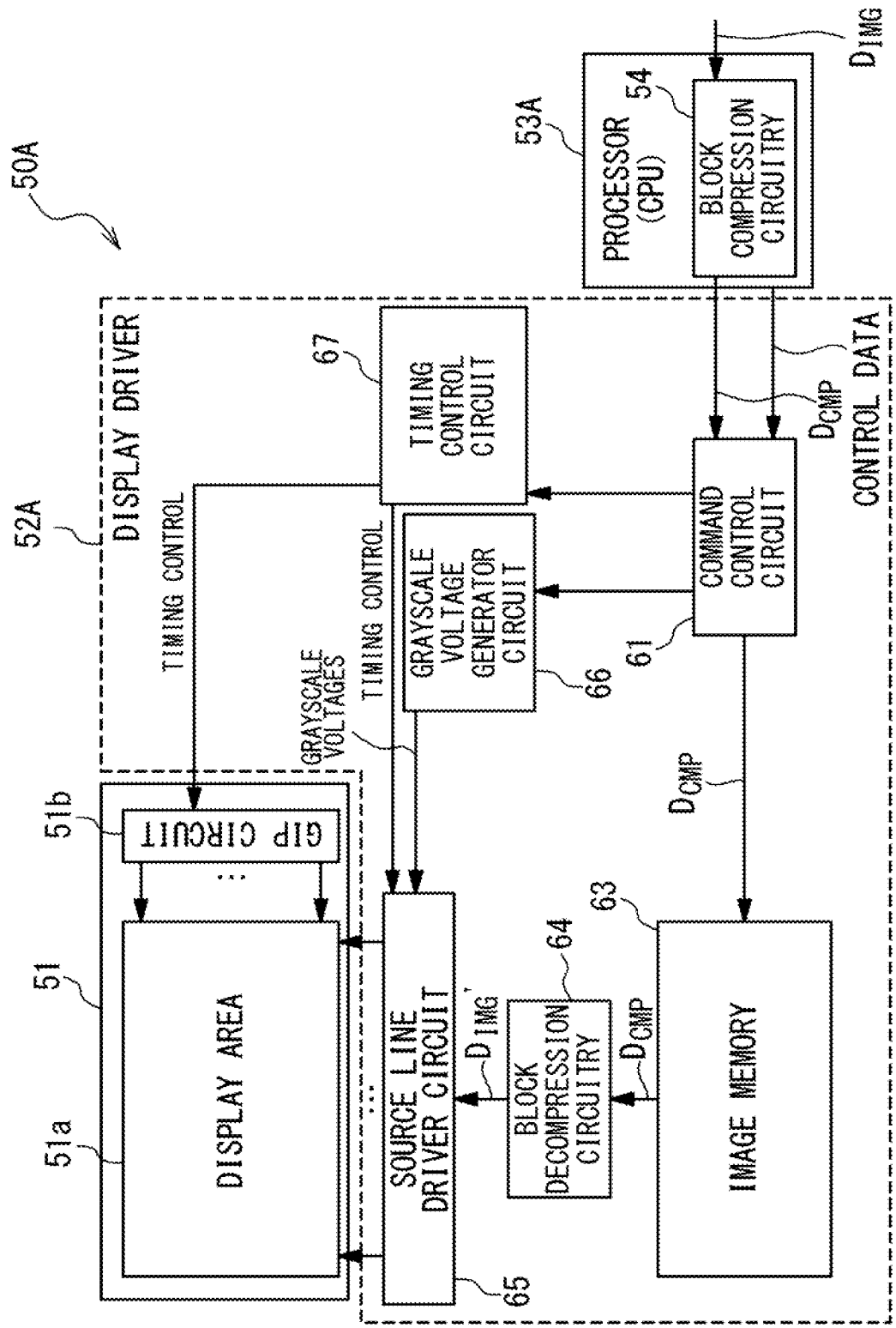
FIG. 11 is a block diagram illustrating an example of the configuration of a display system in which image data are transferred from a processor to a display driver of a display device.

The image compression and decompression system 10, 10A and 10B may be used for transferring image data from a processor to a display driver of a display device. FIG. 11 is a block diagram illustrating an exemplary configuration of a display system thus configured. The display system includes a processor 53A and a display device 50A which includes a display panel 51 and a display driver 52A.

The processor 53A includes a block compression circuitry 54. The block compression circuitry 54 operates as an image compression device which receives image data $D_{IMG}$ corresponding to images to be displayed in the display area 51a of the display panel 51 and generates compressed image data $D_{CMP}$ by compressing the image data $D_{IMG}$. The processor 53A transmits the compressed image data $D_{CMP}$ generated by the block compression circuitry 54 to the display driver 52A and further transmits control data controlling the operation of the display driver 52A to the display driver 52A.

The display driver 52A includes a command control circuit 61, a block decompression circuitry 64, a source line driver circuit 65, a grayscale voltage generator circuit 66, and a timing control circuit 67. The configuration and operation of the display driver 52A illustrated in FIG. 11 are similar to those of the display driver 52 illustrated in FIG. 10. One difference is that the block compression circuitry 62 is removed from the display driver 52A. The command control circuit 61 transfers the compressed image data $D_{CMP}$ received from the processor 53A to the image memory 63. The image memory 63 stores therein the compressed image data $D_{CMP}$ received from the command control circuit 61. The compressed image data $D_{CMP}$ are read out from the image memory 63 and transferred to the block decompression circuitry 64.

The block decompression circuitry 64 operates as an image decompression device which generates decompressed image data $D_{IMG}'$ by performing a block decompression process on the compressed image data $D_{CMP}$ read out from the image memory 63 and supplies the decompressed image data $D_{IMG}'$ to the source line driver circuit 65.

In the display system illustrated in FIG. 11, the image data transferred from the processor 53A to the display driver 52A are compressed which effectively reduces the amount of data transferred over the signal line connected between the processor 53A and the display driver 52A.

(Implementation Example)

In the following, a description is given of a further specific implementation example of the image compression and decompression system configured to select a compression process used for block compression of the image data of each block in response to the feature of the image data of each block.

Figure 12:
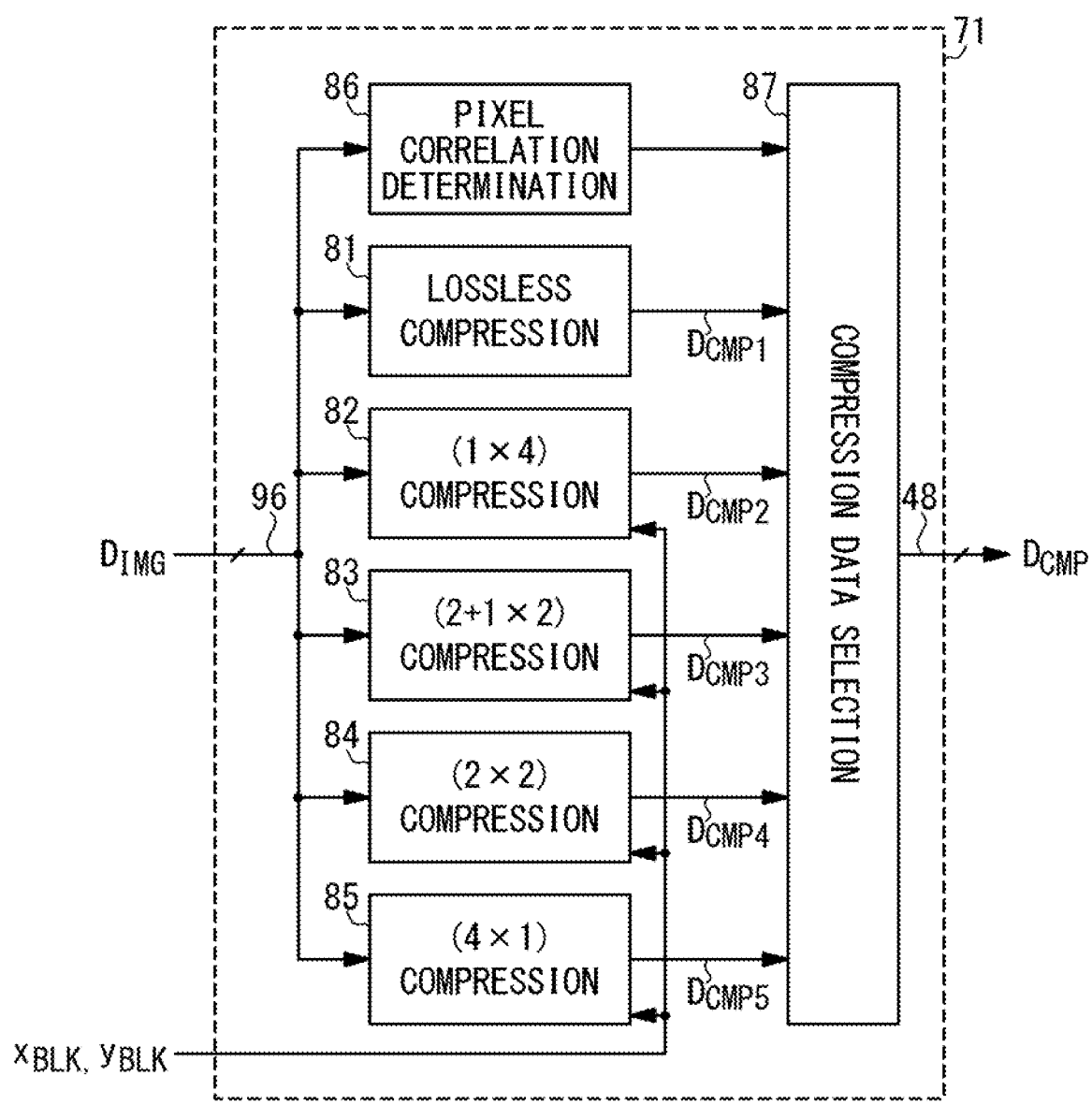
FIG. 12 is a diagram illustrating the configuration of a block compression circuitry of an image compression and decompression system in one implementation example.

FIG. 12 is a block diagram illustrating the configuration of a block compression circuitry 71 of the image compression and decompression system in the present implementation example. The block compression circuitry 71 is configured to generate compressed image data $D_{CMP}$ by performing block compression on image data $D_{IMG}$ of the RGB format. The block compression circuitry 71 illustrated in FIG. 12 may be used as the block compression circuitry 62 integrated in the display driver 52 of the display device 50 illustrated in FIG. 10 or the block compression circuitry 54 integrated in processor 53A of the display device 50A illustrated in FIG. 11.

Also in the present implementation example, one block consists of 2×2 pixels (see FIG. 1) and the image data $D_{IMG}$ represent the grayscale values of the red, green, and blue colors of each pixel with eight bits. The image data $D_{IMG}$ associated with each block includes 96 bits, since each block consists of four pixels. On the other hand, the compressed image data $D_{CMP}$ associated with each block includes 48 bits in the present implementation example. In other words, the block compression circuitry 71 is configured to perform block compression reducing the data amount down to a half in the present example.

The block compression circuitry 71 is configured as an image compression device which generates the compressed image data $D_{CMP}$ by selecting the most suitable one of a plurality of compression processes in response to the correlation (or likelihood) among the image data of four pixels of a compression target block and performing the selected compression process on the image data $D_{IMG}$ of the compression target block. In the present example, the most suitable compression process is selected from a lossless compression process, a (1×4) compression process, a (2+1×2) compression process, a (2×2) compression process, and a (4×1) compression process.

The lossless compression process is designed to compress the image data $D_{IMG}$ so that the original image data $D_{IMG}$ of the four pixels can be losslessly reproduced from the compressed image data. In the present example, the lossless compression process is used when the image data of the four pixels of the compression target block have a specific pattern.

The (1×4) compression process is designed to individually perform a quantization process (in the present implementation example, a quantization process using dither values) on the image data of each of the four pixels of the compression target block. Use of the (1×4) compression process is preferable when the image data of the four pixels of the compression target block are poorly correlated with one another.

The (2+1×2) compression process is designed to determine representative values representing values of image data of two pixels selected from the four pixels of the compression target block and perform a quantization process on the representative values, while individually performing a quantization process on the image data of each of the remaining two pixels. The (2+1×2) compression process is preferable when the image data of two of the four pixels of the compression target block are highly correlated with each other and the image data of the remaining two are poorly correlated with each other.

The (2×2) compression process is designed to perform grouping the image data of the four pixels of the compression target block into two sets each consisting of image data of two pixels, determine representative values representing the image data for each of the two sets, and perform a quantization process on the representative values. The (2×2) compression process is preferable when the image data of two of the four pixels of the compression target block are highly correlated with each other and the image data of the remaining two are also highly correlated with each other.

The (4×1) compression process is designed to determine representative values representing the image data of the four pixels of the compression target block and perform a quantization process on the representative values. The (4×1) compression process is preferable when the image data of the four pixels of the compression target block are highly correlated with each other.

The selection of the above-described five compression processes is based on whether the image data of the four pixels of the compression target block has a specific pattern or the correlations among the image data of selected two of the four pixels calculated for all the allowed combinations of the two pixels. For example, when the image data of the four pixels are highly correlated with one another, the (4×1) compression process is used. When the image data of two of the four pixels are highly correlated and the image data of the remaining two are also highly correlated, the (2×2) compression process is used. Details of the above-described five compression processes will be described later.

To perform the above-described operation, the block compression circuitry 71 includes a lossless compression circuit 81, a (1×4) compression circuit 82, a (2+1×2) compression circuit 83, a (2×2) compression circuit 84, a (4×1) compression circuit 85, a pixel correlation determination circuit 86, and a compressed data selection circuit 87.

The lossless compression circuit 81 generates a losslessly compressed data $D_{CMP1}$ by performing the above-described lossless compression process on the image data $D_{IMG}$ associated with the compression target block. The (1×4) compression circuit 82 generates a (1×4) compressed image data $D_{CMP2}$ by performing the above-described (1×4) compression process on the image data $D_{IMG}$ associated with the compression target block, and the (2+1×2) compression circuit 83 generates a (2+1×2) compressed image data $D_{CMP3}$ by performing the above-described (2+1×2) compression process on the image data $D_{IMG}$ associated with the compression target block. Furthermore, the (2×2) compression circuit 84 generates a (2×2) compressed image data $D_{CMP4}$ by performing the above-described (2×2) compression process on the image data $D_{IMG}$ associated with the compression target block, and the (4×1) compression circuit 85 generates a (4×1) compressed image data $D_{CMP5}$ by performing the above-described (4×1) compression process on the image data $D_{IMG}$ associated with the compression target block.

The pixel correlation determination circuit 86 determines the correlation among the image data of the four pixels of the compression target block and supplies to the compressed data selection circuit 87 the selection data indicating which of the lossless compression process, the (1×4) compression process, the (2+1×2) compression process, the (2×2) compression process, and the (2×2) compression process is to be selected. The compressed data selection circuit 87 selects the compressed imaged data $D_{CMP}$ to be finally used from among the compressed data $D_{CMP1}$ to $D_{CMP5}$ respectively received from the lossless compression circuit 81, the (1×4) compression circuit 82, the (2+1×2) compression circuit 83, the (2×2) compression circuit 84, and the (4×1) compression circuit 85 in response to the supplied selection data.

In the present example, quantization processes using dither values are performed in the block compressions in the (1×4) compression circuit 82, the (2+1×2) compression circuit 83, the (2×2) compression circuit 84, and the (4×1) compression circuit 85, and the dither values used in the quantization processes are generated from the block coordinates $x_{BLK}$ and $y_{BLK}$ of the compression target block. As is understood from the above-described discussion, the generation of the dither values used in the quantization processes from the block coordinates $x_{BLK}$ and $y_{BLK}$ effectively reduces image quality deterioration in block compression processing.

Figure 13:
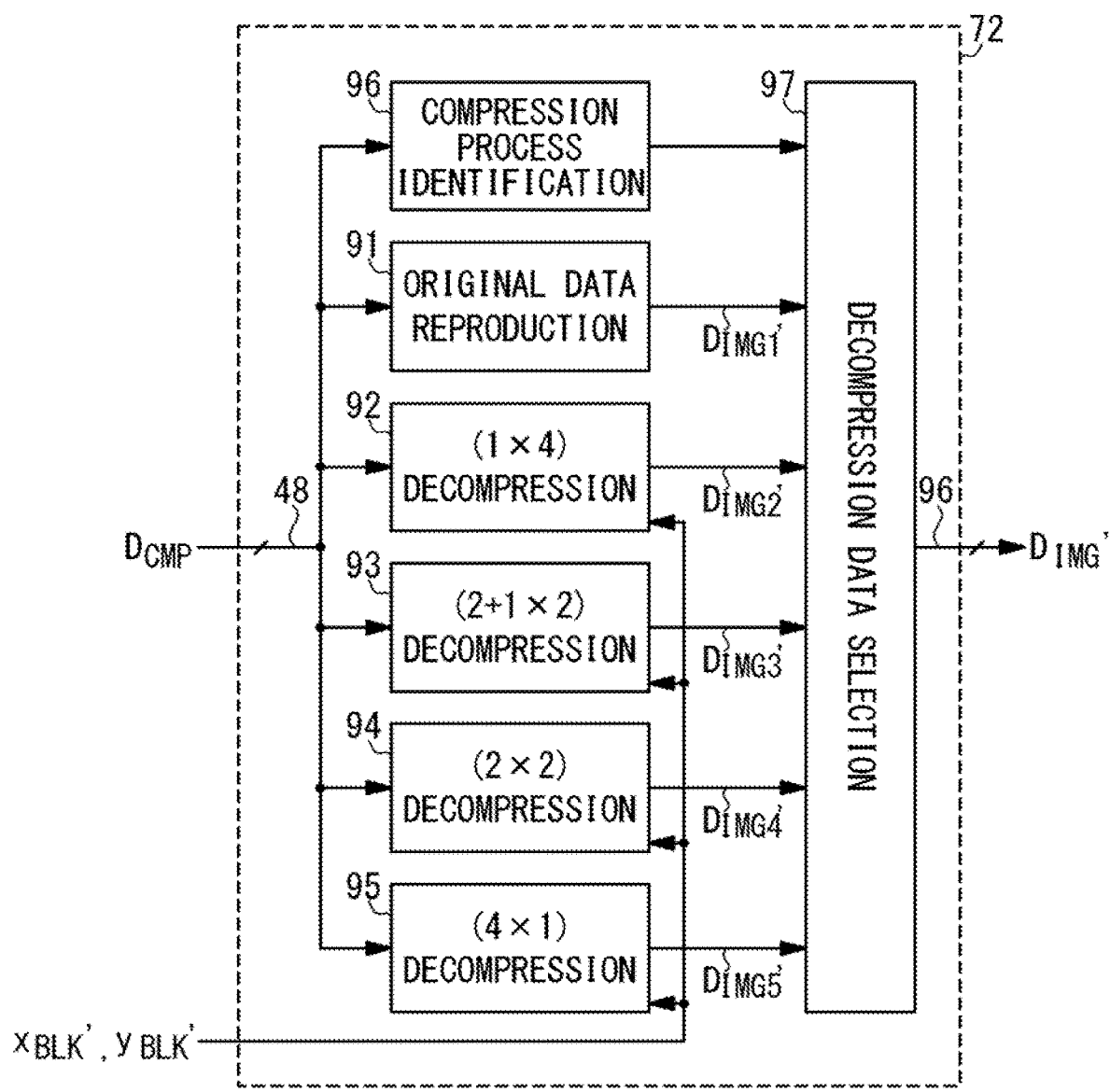
FIG. 13 is a diagram illustrating the configuration of a block decompression circuitry of the image compression and decompression system in the present implementation example.

FIG. 13 is a block diagram illustrating the configuration of the block decompression circuitry 72 of the image compression and decompression system in the present implementation example. The block decompression circuitry 72 is configured as an image decompression device which identifies which of the above-described five compression processes is actually used to generate the compressed image data $D_{CMP}$ by the block compression circuitry 71 and generates decompressed image data $D_{IMG}{}'$ by decompressing the compressed image data $D_{CMP}$ through the decompression process corresponding to the actually-used compression process. The block decompression circuitry 72 illustrated in FIG. 13 may be used as the block decompression circuitry 64 integrated in the display driver 52 of the display device 50 illustrated in FIG. 10, or the block decompression circuitry 64 integrated in the display driver 52A of the display device 50A illustrated in FIG. 11.

In the present example, the block decompression circuitry 72 includes an original data reproduction circuit 91, a (1×4) decompression circuit 92, a (2+1×2) decompression circuit 93, a (2×2) decompression circuit 94, a (4×1) decompression circuit 95, a compression process identification circuit 96, and a decompressed data selection circuit 97. The original data reproduction circuit 91 is configured to generate decompressed image data $D_{IMG1}{}'$ by performing a decompression process adapted to the above-described lossless compression process on the compressed image data $D_{CMP}$ supplied to the block decompression circuitry 72. The (1×4) decompression circuit 92 is configured to generate decompressed image data $D_{IMG2}{}'$ by performing a decompression process adapted to the above-described (1×4) compression process on the compressed image data $D_{CMP}$ supplied to the block decompression circuitry 72 and the (2+1×2) decompression circuit 93 is configured to generate decompressed image data $D_{IMG3}{}'$ by performing a decompression process adapted to the above-described (2+1×2) compression process on the compressed image data $D_{CMP}$ supplied to the block decompression circuitry 72. Furthermore, the (2×2) decompression circuit 94 is configured to generate decompressed image data $D_{IMG4}{}'$ by performing a decompression process adapted to the above-described (2×2) compression process on the compressed image data $D_{CMP}$ supplied to the block decompression circuitry 72 and the (4×1) decompression circuit 95 is configured to generate decompressed image data $D_{IMG5}{}'$ by performing a decompression process adapted to the above-described (4×1) compression process on the compressed image data $D_{CMP}$ supplied to the block decompression circuitry 72. Details of the decompression processes performed in the original data reproduction circuit 91, the (1×4) decompression circuit 92, the (2+1×2) decompression circuit 93, the (2×2) decompression circuit 94, and the (4×1) decompression circuit 95 will be described later.

The compression process identification circuit 96 identifies which of the above-described five compression processes (the lossless compression process, the (1×4) compression process, the (2+1×2) compression process, the (2×2) compression process, and the (4×1) compression process) is used to generate the compressed image data $D_{CMP}$ and supplies to the decompressed data selection circuit 97 a compression process identification data indicating the compression process actually used to generate the compressed image data $D_{CMP}$. In the present implementation example, the compressed imaged data $D_{CMP}$ include a compression process identification data identifying the compression process actually used to generate the compressed image data $D_{CMP}$. The compression process identification circuit 96 identifies the compression process actually used to generate the compressed image data $D_{CMP}$ on the basis of the compression process identification data and supplies to the decompressed data selection circuit 97 a selection data selecting the decompressed image data corresponding to the identified compression process from among the decompressed image data $D_{IMG1}{}'$ to $D_{IMG5}{}'$ received from the original data reproduction circuit 91, the (1×4) decompression circuit 92, the (2+1×2) decompression circuit 93, the (2×2) decompression circuit 94, and the (4×1) decompression circuit 95, respectively. The decompressed data selection circuit 97 selects the decompressed image data $D_{IMG}{}'$ to be finally output, from among the decompressed image data $D_{IMG1}{}'$ to $D_{IMG5}{}'$ in response to the selection data.

In the present example, inverse quantization processes using dither values are performed in the block decompression processes performed in the (1×4) decompression circuit 92, the (2+1×2) decompression circuit 93, the (2×2) decompression circuit 94, and the (4×1) decompression circuit 95 and the dither values used in the inverse quantization processes are generated from the block coordinates $x_{BLK}{}'$ and $y_{BLK}{}'$ of the decompression target block.

Next, a description is given of details of the block compression processing performed in the block compression circuitry 71 and the block decompression processing performed in the block decompression circuitry 72.

Figure 14A:
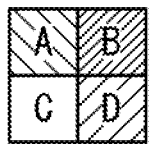
FIGS. 14A to 14D are diagrams schematically illustrating correlation determination of image data associated with pixels of a compression target block in the present implementation example.

In the block decompression processing of the present example, the pixel correlation determination circuit 86 of the block compression circuitry 71 determines which of the cases described below the correlation among the image data of the four pixels of the compression target block falls into:

Case A: image data of any two pixels selected from the four pixels are poorly correlated for any possible combinations of the two pixels (see FIG. 14A).

Figure 14B:
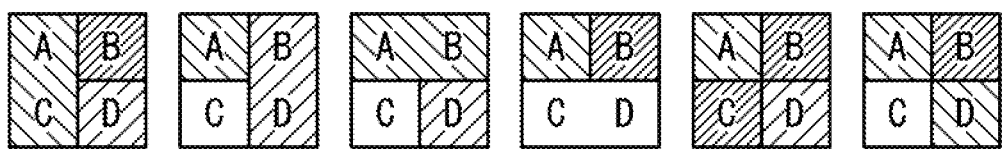

Case B: image data of two pixels are highly correlated and image data of the remaining two pixels are poorly correlated with each other and also poorly correlated with those of the preceding two pixels (see FIG. 14B).

Figure 14C:
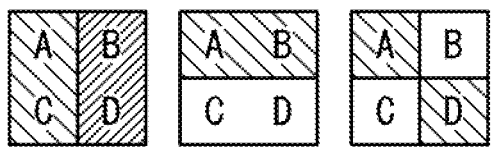

Case C: image data of two pixels are highly correlated and image data of the remaining two pixels are also highly correlated (see FIG. 14C).

Figure 14D:
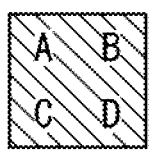

Case D: image data of the four pixels are highly correlated (FIG. 14D).

FIG. 15 is a flowchart illustrating an exemplary procedure for determining the correlation in the pixel correlation determination circuit 86 and selecting the most suitable compression process on the basis of the determined correlation. In the following description, the grayscale values of the red (R) color described in the image data associated with pixels A, B, C, and D are respectively referred to as R data $R_A$, $R_B$, $R_C$, and $R_D$. Similarly, the grayscale values of the green (G) color described in the image data associated with pixels A, B, C, and D are respectively referred to as G data $G_A$, $G_B$, $G_C$, and $G_D$, and the grayscale values of the blue (B) color described in the image data associated with pixels A, B, C, and D are respectively referred to as B data $B_A$, $B_B$, $B_C$, and $B_D$.

It is first determined whether the image data of pixels A, B, C, and D fall into any of predetermined specific patterns (step S01), and when the image data of pixels A, B, C, and D fall into any of the specific patterns, the lossless compression process is performed. In the present implementation example, predetermined patterns in which the number of different data values of the image data of pixels A, B, C, and D is five or less are selected as the specific patterns for which the lossless compression process is to be performed.

In one example, the lossless compression process is performed when the image data of pixels A, B, C, and D fall into any of the following four patterns (1) to (4):

(1) The image data of pixels A to D are identical (see FIG. 16A).

When the image data of pixels A to D satisfy the following condition (1a), the lossless compression process is performed:

$R_A=R_B=R_C=R_D$, $G_A=G_B=G_C=G_D$, and $B_A=B_B=B_C=B_D$. Condition (1a)

In this case, the number of different data values of the image data of pixels A to D is three.

(2) The three grayscale values of the red, green and blue colors of each of pixels A, B, C, and D are identical.

The lossless compression process is performed also when the image data of pixels A to D satisfies the following condition (2a):

$R_A=G_A=B_A$, $R_B=G_B=B_B$, $R_C=G_C=B_C$, and $R_D=G_D=B_D$. Condition (2a):

In this case, the number of different data values of the image data of pixels A, B, C, and D is four.

(3) Data values of two of R, G and B data are identical for all of the pixels A, B, C, and D (see FIGS. 16C to 16E).

The lossless compression process is performed also when any one of the following three conditions (3a) to (3c) is satisfied:

$G_A=G_B=G_C=G_D=B_A=B_B=B_C=B_D$. Condition (3a)

$B_A=B_B=B_C=B_D=R_A=R_B=R_C=R_D$. Condition (3b)

$R_A=R_B=R_C=R_D=G_A=G_B=G_C=G_D$. Condition (3c)

In this case, the number of different data values of pixels A, B, C, and D is five.

(4) Data values of one of R, G and B data are identical for pixels A, B, C, and D and data values of other two data are identical for pixels A, B, C, and D (see FIGS. 16F to 16H).

Furthermore, the lossless compression process is performed also when any one of the following three conditions (4a) to (4c) is satisfied:

$G_A=G_B=G_C=G_D$, $R_A=B_A$, $R_B=B_B$, $R_C=B_C$, and $R_D=B_D$. Condition (4a)

$B_A=B_B=B_C=B_D$, $R_A=G_A$, $R_B=G_B$, $R_C=G_C$, and $R_D=G_D$. Condition (4b)

$R_A=R_B=R_C=R_D$, $G_A=B_A$, $G_B=B_B$, $G_C=B_C$, and $G_D=B_D$. Condition (4c)

In this case, the number of different data values of the image data of pixels A, B, C, and D is five.

When the lossless compression process is not performed, the compression process is selected depending on the correlation among the image data of pixels A, B, C, and D. More specifically, the pixel correlation determination circuit 86 determines which of the above-described cases A to D the image data of pixels A, B, C, and D fall into:

In detail, when the following condition (A) is not satisfied for all the combinations of i and j which meet:

i ∈ {A, B, C, D}, j ∈ {A, B, C, D}, and i≠j, the pixel correlation determination circuit 86 determines that the image data of pixels A, B, C, and D fall into case A (i.e., there are poor correlations between image data of two pixels selected from pixels A to D for any possible combinations of the two pixels) (Step S02).

$|Ri-Rj| \le Th1$, $|Gi-Gj| \le Th1$, and $|Bi-Bj| \le Th1$, Condition (A)

where Th1 is a predetermined threshold value.

When the image data of pixels A, B, C, and D fall into case A, the pixel correlation determination circuit 86 determines that the (1×4) compression process is to be performed.

When not determining that the image data of pixels A, B, C, and D fall into case A, the pixel correlation determination circuit 86 defines a first pair of pixels and a second pair of pixels selected from pixels A, B, C, and D and, for all the possible combinations of the first and second pairs, determines whether or not a condition is satisfied in which the difference between data values of the image data of the two pixels belonging to the first pair is smaller than a predetermined value, and the difference between data values of the image data of the two pixels belonging to the second pair is smaller than the predetermined value. More specifically, the pixel correlation determination circuit 86 determines whether or not any of the following conditions (B1) to (B3) is satisfied (Step S03):

$|R_A-R_B| Th2$, $|G_A-G_B| Th2$, $|B_A-B_B| Th2$, $|R_C-R_D| Th2$, $|G_C-G_D| \le Th2$, and $|B_C-B_D| \le Th2$. Condition (B1)

$|R_A-R_C| \le Th2$, $|G_A-G_C| \le Th2$, $|B_A-B_C| \le Th2$, $|R_B-R_D| \le Th2$, $|G_B-G_D| \le Th2$, and $|B_B-B_D| \le Th2$.                    Condition (B2)

$|R_A|R_D| \le Th2$, $|G_A-G_D| \le Th2$, $|B_A-B_D| \le Th2$, $|R_B-R_C| \le Th2$, $|G_B-G_C| \le Th2$, and $|B_B-B_C| \le Th2$.                    Condition (B3)

It should be noted that Th2 is a predetermined threshold value.

If none of the above conditions (B1) to (B3) is satisfied, the pixel correlation determination circuit 86 determines that the image data of pixels A, B, C, and D fall into case B (i.e., the image data of two pixels are highly correlated and the image data of the remaining two pixels are poorly correlated with each other and also poorly correlated with the image data of the preceding two pixel). In this case, the pixel correlation determination circuit 86 determines to perform the (2+1×2) compression process.

When the image data of pixels A, B, C, and D fall into neither case A nor case B, the pixel correlation determination circuit 86 determines whether or not the difference between the maximum and minimum values of the image data of the four pixels is smaller than a predetermined value for each of R data, G data and B data of the four pixels. More specifically, the pixel correlation determination circuit 86 determines whether the following condition (C) is satisfied (Step S04):

$\max(R_A, R_B, R_C, R_D) - \min(R_A, R_B, R_C, R_D) < Th3$, $\max(G_A, G_B, G_C, G_D) - \min(G_A, G_B, G_C, G_D) < Th3$, and $\max(B_A, B_B, B_C, B_D) - \min(B_A, B_B, B_C, B_D) < Th3$.   Condition (C)

When condition (C) is not satisfied, the pixel correlation determination circuit 86 determines that the image data of pixels A to D fall into case C (that is, image data of two pixels are highly correlated and image data of the remaining pixels are also highly correlated). In this case, the pixel correlation determination circuit 86 determines to perform the (2×2) compression process.

When condition (C) is satisfied, on the other hand, the pixel correlation determination circuit 86 determines that the image data of pixels A to D fall into case D (the image data of pixels A to D are high correlated with one another). In this case, the pixel correlation determination circuit 86 determines to perform the (4×1) compression process.

The pixel correlation determination circuit 86 generates the selection data to indicate which of the (1×4) compression process, (2+1×2) compression process, (2×2) compression process and (4×1) compression process is to be used on the basis of the correlation determination result described above, and sends the selection data to the compressed data selection circuit 87. The compressed data selection circuit 87 is responsive to the selection data received from the pixel correlation determination circuit 86 for outputting as the compressed image data $D_{CMP}$ any of the losslessly-compressed data $D_{CMP1}$ output from the lossless compression circuit 81, the (1×4) compressed data $D_{CMP2}$ output from the (1×4) compression circuit 82, the (2+1×2) compressed data $D_{CMP3}$ output from the (2+1×2) compression circuit 83, the (2×2) compressed data $D_{CMP4}$ output from the (2×2) compression circuit 84 and the (4×1) compressed data $D_{CMP5}$ outputted from the (4×1) compression circuit 85.

A detailed description is next given of the lossless compression process, the (1×4) compression process, the (2+1×2) compression process, the (2×2) compression process and the (4×1) compression process, which are performed in the block compression circuitry 71, and the decompression processes performed on the compressed image data $D_{CMP}$ generated with these compression processes in the block decompression circuitry 72.

1. Lossless Compression and Decompression Processes

In the present example, the lossless compression process is achieved by rearranging the data values of the image data of pixels A, B, C, and D. FIG. 17 illustrates an exemplary format of the losslessly-compressed data $D_{CMP1}$ generated by the lossless compression process. In the present embodiments, the losslessly-compressed data $D_{CMP1}$ are 48-bit data including a compression process identification data, a pattern type data, data #1 to #5 and a padding data.

The compression process identification data indicates the used compression process and four bits are allocated to the compression process identification data in the losslessly-compressed data $D_{CMP1}$. In the present implementation example, the value of the compression process identification data of the losslessly-compressed data $D_{CMP1}$ is "1111".

The pattern type data identifies the pattern which the image data of pixels A to D fall into. In the present implementation examples, in which eight specific patterns (that is, the patterns corresponding to the above-described conditions (1a), (2a), (3a) to (3c) and (4a) to (4c), respectively) are defined, the pattern type data are 3-bit data.

Data #1 to #5 are obtained by rearranging data values of the image data of pixels A, B, C, and D. All of data #1 to #5 are 8-bit data. As described above, the number of different data values of the image data of pixels A, B, C, and D is equal to or less than five when the lossless compression process is selected. This means that all the data values of the image data of pixels A, B, C, and D can be contained as data #1 to #5.

The padding data are added to make the number of bits of the losslessly-compressed data $D_{CMP1}$ equal to compressed image data generated by other compression processes. In the present embodiments, the padding data is a one-bit data.

The decompression of the losslessly-compressed data generated by the above-described lossless compression process is achieved by rearranging data #1 to #5 with reference to the pattern type data. Since the pattern type data describes the pattern which the image data of pixels A, B, C, and D fall into, the image data of pixels A, B, C, and D can be completely reproduced with no compression error by referring to the pattern type data.

2. (1×4) Compression and Decompression Processes

FIG. 18 is a diagram schematically illustrating an exemplary format of the (1×4) compressed data $D_{CMP2}$. As described above, the (1×4) compression process is used when there are poor correlations among all the possible combinations of image data of two pixels selected from the four pixels of the compression target block. In the present implementation example, as illustrated in FIG. 18, the (1×4) compressed data $D_{CMP2}$ includes a compression process identification data, $R_A{}^*$data, $G_A{}^*$data, $B_A{}^*$data, $R_B{}^*$data, $G_B{}^*$data, $B_B{}^*$data, $R_C{}^*$data, $G_C{}^*$data, $B_C{}^*$data, $R_D{}^*$data, $G_D{}^*$data and $B_D{}^*$data. In the present implementation example, the (1×4) compressed data $D_{CMP2}$ is a 48-bit data.

The compression process identification data indicates the used compression process; in the (1×4) compressed data $D_{CMP2}$, one bit is allocated to the compression process identification data. In the present implementation example, the value of the compression process identification data of the (1×4) compressed data $D_{CMP2}$ is "0".

The $R_A$*data, $G_A$*data and $B_A$*data are obtained by performing a quantization process on the R data $R_A$, G data $G_A$ and B data $B_A$ of pixel A, respectively, and the $R_B$*data, $G_B$*data and $B_B$*data are obtained by performing a quantization process on the R data $R_B$, G data $G_B$ and B data $B_B$ of pixel B, respectively. Correspondingly, the $R_C$*data, $G_C$*data and $B_C$*data are obtained by performing a quantization process on the R data $R_C$, G data $G_C$ and B data $B_C$ of pixel C, respectively, and the $R_D$*data, $G_D$*data and $B_D$*data are obtained by performing a quantization process on the R data $R_D$, G data $G_D$ and B data $B_D$ of pixel D, respectively. In the present implementation example, only the $B_D$*data associated with the B data of pixel D is a 3-bit data, and the others data (that is, the $R_A$*, $G_A$* and $B_A$*data, the $R_B$*, $G_B$* and $B_B$*data, the $R_C$*, $G_C$* and $B_C$*data and the $R_D$* and $G_D$*data) are 4-bit data. As is described later in detail, dither values generated from the block coordinates $x_{BLK}$ and $y_{BLK}$ of the compression target block are used in the quantization process to generate the $R_A$*, $G_A$* and $B_A$*data, the $R_B$*, $G_B$* and $B_B$*data, the $R_C$*, $G_C$* and $B_C$*data and the $R_D$*, $G_D$* and $B_D$*data.

FIG. 19A schematically illustrates data processing in the (1×4) compression process. In the (1×4) compression process, a quantization process using dither values are performed on the image data of pixels A to D to achieve bit reduction of the image data of pixels A to D. In FIG. 19A, the data processing in the (1×4) compression process is illustrated with an assumption that the dither values E0, E1, E2 and E3 associated with pixels A, B, C, and D are 0, 5, 10 and 15, respectively.

More specifically, when the $R_A$*, $G_A$*, and $B_A$*data are generated, the four-bit dither value E0 is added to each of the R data $R_A$, G data $G_A$, and B data $B_A$ of pixel A. The dither value E0 may be obtained, for example, as the lower four bits of the pseudo-random number V0 calculated in accordance with the above-described expression (3a). It should be noted that the coordinates $x_A$ and $x_B$ of pixel A of the compression target block are used in the calculation of the pseudo-random number V0 in accordance with expression (3a), and the coordinates $x_A$ and $x_B$ of pixel A can be determined from the coordinates $x_{BLK}$ and $y_{BLK}$ of the compression target block.

This is followed by performing rounding or bit truncation on the R data, G data, and B data of pixel A with the dither value E0 added thereto, to generate the $R_A$*, $G_A$*, and $B_A$*data. In the implementation example illustrated in FIG. 19A, a value of 8 is added to the R data, G data, and B data of pixel A with the dither value E0 added thereto, and this is followed by bit truncation of the lower four bits.

The $R_B$*, $G_B$*, and $B_B$*data, the $R_C$*, $G_C$*, and $B_C$*data and the $R_D$*, $G_D$*, and $B_D$*data are generated in a similar manner. When the $R_B$*, $G_B$*, and $B_B$*data are generated, the four-bit dither value E1 is added to each of the R data $R_B$, G data $G_B$, and B data $B_B$ of pixel B. The dither value E1 may be obtained, for example, as the lower four bits of the pseudo-random number V1 calculated in accordance with the above-described expression (3b). This is followed by performing rounding or bit truncation on the R data, G data, and B data of pixel A with the dither value E1 added thereto, to generate the $R_B$*, $G_B$*, and $B_B$*data. In the implementation example illustrated in FIG. 19A, a value of 8 is added to the R data, G data, and B data of pixel B with the dither value E1 added thereto, and this is followed by bit truncation of the lower four bits.

When the $R_C$*, $G_C$*, and $B_C$*data are generated, the four-bit dither value E2 is added to each of the R data $R_C$, G data $G_C$, and B data $B_C$ of pixel C. The dither value E2 may be obtained, for example, as the lower four bits of the pseudo-random number V2 calculated in accordance with the above-described expression (3c). This is followed by performing rounding or bit truncation on the R data, G data, and B data of pixel C with the dither value E2 added thereto, to generate the $R_C$*, $G_C$*, and $B_C$*data. In the implementation example illustrated in FIG. 19A, a value of 8 is added to the R data, G data, and B data of pixel C with the dither value E2 added thereto, and this is followed by bit truncation of the lower four bits.

When the $R_D$*, $G_D$*, and $B_D$*data are generated, the four-bit dither value E3 is added to each of the R data $R_D$, G data $G_D$, and B data $B_D$ of pixel D. The dither value E3 may be obtained, for example, as the lower four bits of the pseudo-random number V3 calculated in accordance with the above-described expression (3d). This is followed by performing rounding or bit truncation on the R data, G data, and B data of pixel D with the dither value E3 added thereto, to generate the $R_D$*, $G_D$*, and $B_D$*data. In the implementation example illustrated in FIG. 19A, the $R_D$ data* and $G_D$ data* are generated by adding a value of 8 to the R data and G data of pixel D with the dither value E3 added thereto, and then performing bit truncation of the lower four bits. while the $B_D$ data* is generated by adding a value of 16 to the B data of pixel D with the dither value E3 added thereto, and then performing bit truncation of the lower five bits.

The (1×4) compressed data $D_{CMP2}$ is generated by attaching the compression process identification data of a value "0" to the $R_A$*, $G_A$*, $B_A$*data, $R_B$*, $G_B$*, $B_B$*data, $R_C$*, $G_C$*, $B_C$*data and $R_D$*, $G_D$*, and $B_D$*data thus generated.

Next, a description is given of data processing in the decompression process of the compressed image data $D_{CMP2}$, which is compressed with the (1×4) compression process, with reference to FIG. 19B. In the decompression process of (1×4) compressed data $D_{CMP2}$, an inverse quantization process using dither values is performed on the $R_A$*, $G_A$*, $B_A$*data, the $R_B$*, $G_B$*, $B_B$*data, the $R_C$*, $G_C$*, $B_C$*data and the $R_D$*, $G_D$*, $B_D$*data.

More specifically, the R, G, and B data of pixel A of the decompressed image data $D_{IMG2}'$ are respectively reproduced as values obtained by performing a left shift of four bits on the $R_A$*, $G_A$*, and $B_A$*data and then subtracting the dither value E0'. The dither value E0' may be obtained, for example, as the lower four bits of the pseudo-random number V0' calculated in accordance with the above-described expression (6a). It should be noted that the coordinates $x_A'$ and $x_B'$ of pixel A of the decompression target block are used in the calculation of the pseudo-random number V0' in accordance with expression (6a), and the coordinates $x_A'$ and $x_B'$ of pixel A can be determined from the coordinates $x_{BLK}'$ and $y_{BLK}'$ of the decompression target block.

Similarly, the R, G and B data of pixel B of the decompressed image data $D_{IMG2}'$ are respectively reproduced as values obtained by performing a left shift of four bits on the $R_B$*, $G_B$*, and $B_B$*data and then subtracting the dither value E1'. The dither value E1' may be obtained, for example, as the lower four bits of the pseudo-random number V1' calculated in accordance with the above-described expression (6b).

Furthermore, the R, G, and B data of pixel C of the decompressed image data $D_{IMG2}'$ are respectively reproduced as values obtained by performing a left shift of four bits on the $R_C$*, $G_C$*, and $B_C$*data and then subtracting the dither value E2'. The dither value E2' may be obtained, for example, as the lower four bits of the pseudo-random number V2' calculated in accordance with the above-described expression (6c).

Furthermore, the R and G data of pixel D of the decompressed image data $D_{IMG2}$' are respectively reproduced as values obtained by performing a left shift of four bits on the $R_D$* and $G_D$*data and then subtracting the dither value E3'. The dither value E3' may be obtained, for example, as the lower four bits of the pseudo-random number V3' calculated in accordance with the above-described expression (6d). Finally, the B data of pixel D of the decompressed image data $D_{IMG2}$' is reproduced as a value obtained by performing a left shift of five bits on the $B_D$*data and then subtracting the dither value E3'.

This completes the decompression process of the (1×4) compressed data.

3. (2+1×2) Compression and Decompression Processes

FIG. 20 schematically illustrates the format of the (2+1×2) compressed data $D_{CMP3}$. As described above, the (2+1×2) compression process is used when image data of two pixels are highly correlated with each other and image data of the remaining two pixels are poorly correlated with each other and also poorly correlated with the image data of the preceding two pixels. In the present example illustrated in FIG. 20, the (2+1×2) compressed data $D_{CMP3}$ include a compression process identification data, pattern recognition data, R representative value, G representative value, B representative value, β comparison data, magnitude recognition data, Ri*data, Gi*data, Bi*data, Rj*data, Gj*data, and Bj*data. It should be noted that the (2+1×2) compressed data $D_{CMP3}$ are 48-bit data, as is the case with the above-described losslessly-compressed data $D_{CMP1}$ and (1×4) compressed data $D_{CMP2}$.

The compression process identification data indicates the used compression process, and two bits are allocated to the compression process identification data in the (2+1×2) compressed data $D_{CMP3}$. In the present example, the value of the compression process identification data of the (2+1×2) compressed data $D_{CMP3}$ is "10".

The pattern recognition data is a three-bit data indicating which two of pixels A to D have the image data highly-correlated. When the (2+1×2) compression process is used, image data of two of pixels A to D are highly correlated, and image data of the other two pixels are poorly correlated with the image data of the preceding two pixels. Accordingly, the number of possible combinations of two pixels having the image data highly-correlated is six as follows:

Pixels A and C
Pixels B and D
Pixels A and B
Pixels C and D
Pixels B and C
Pixels A and D The pattern recognition data indicates, with three bits, which of these six combinations the highly-correlated two pixels are.

The R, G, and B representative values are values representing the R, G, and B data of the two pixels having the image data highly-correlated, respectively. In the example of FIG. 20, the R and G representative values are each a 5-bit or 6-bit data and the B representative value is a 5-bit data.

The β comparison data indicates whether the difference between the R data of the highly-correlated two pixels, and the difference between the G data of the same two pixels are larger than a predetermined threshold value β. In this embodiment, the β comparison data is a 2-bit data. On the other hand, the magnitude relation data indicates which of the highly-correlated two pixels has an R data of a larger value, and which of the highly-correlated two pixels has a G data of a larger value. The magnitude relation data associated with the R data is generated only when the difference between the R data of the highly-correlated two pixels is larger than the threshold value β, and the magnitude relation data associated with the G data is generated only when the difference between the G data of the highly-correlated two pixels is larger than the threshold value β. Accordingly, the magnitude relation data is a 0 to 2-bit data.

The Ri*, Gi*, Bi*data, and the Rj*, Gj*, and Bj*data are obtained by performing a quantization process the R data, G data, and B data of the poorly-correlated two pixels, respectively. Note that i and j are two selected from A, B, C, and D so that i and j are different from each other. In this embodiment, all of the Ri*data, Gi*data, Bi*data, Rj*data, Gj*data, and Bj*data are 4-bit data.

In the following, a description is given of the data processing performed in the (2+1×2) compression process with reference to FIG. 21A. In the following, a description is given of the generation of the (2+1×2) compressed data $D_{CMP3}$ when the image data of pixels A and B are highly correlated with each other, the image data of pixels C and D are poorly correlated with each other and also poorly correlated with the image data of pixels A and B. A person skilled in the art would easily understand that the (2+1×2) compressed data $D_{CMP3}$ can be generated in a similar manner for different cases.

A description is first given of the compression process of the image data of pixels A and B, which are highly correlated. First, the average value of the R data $R_A$ and $R_B$, the average value of G data $G_A$ and $G_B$ and the average value of B data $B_A$ and $B_B$ are calculated. In the present implementation example, the average values Rave, Gave, and Bave of the R data, G data and B data are calculated by the following equations:

$$\text{Rave}=(R_A+R_B+1)/2,$$

$$\text{Gave}=(G_A+G_B+1)/2, \text{ and}$$

$$\text{Bave}=(B_A+B_B+1)/2.$$

Furthermore, the difference $|R_A-R_B|$ between the R data of pixels A and B and the difference $|G_A-G_B|$ between the G data are compared with the predetermined threshold value β. The results of these comparisons are incorporated into the (2+1×2) compressed data $D_{CMP3}$ as the β comparison data.

Furthermore, the magnitude relation data is generated by the following procedure, for the R and G data of pixels A and B. When the difference $|R_A-R_B|$ between the R data of pixels A and B is larger than the threshold value β, the magnitude relation data includes a data indicating which of pixels A and B has the larger R data. When the difference $|R_A-R_B|$ between the R data of pixels A and B is equal to or smaller than the threshold value β, the magnitude relation data are generated so as not to describe the magnitude relation between the R data of pixels A and B. Similarly, when the difference $|G_A-G_B|$ between the G data of pixels A and B is larger than the threshold value β, the magnitude relation data includes a data indicating which of pixels A and B has the larger G data. When the difference $|G_A-G_B|$ between the G data of pixels A and B is equal to or smaller than the threshold value β, the magnitude relation data are generated so as not to describe the magnitude relation between the G data of pixels A and B. The magnitude relation data thus generated is incorporated into the (2+1×2) compressed data $D_{CMP3}$.

This is followed by calculating the R representative value, G representative value and B representative value by respectively performing a quantization process using dither values on the average values Rave, Gave, and Bave of the R data, G data and B data of pixels A and B.

In the quantization process of the R representative value, G representative value and B representative value, a dither value is added to the average values Rave, Gave, and Bave of the R data, G data and B data of pixels A and B. In the present example, the dither value is calculated from the block. The dither value may be calculated by using the coordinates of one of pixels A and B (which are highly correlated) as the lower four bits of the pseudo-random number V0 or V1 calculated in accordance with expression (3a) or (3b). Illustrated in FIG. 21A is the example in which the dither value E0 calculated from the coordinates of pixel A is used for the quantization process and the dither value E0 is calculated as "0".

This is followed by calculating the R representative value, G representative value, and B representative value by performing rounding or bit truncation on the average values Rave, Gave, and Bave with the dither value added thereto.

The numerical values added to the average value Rave of the R data and the average value Gave of the G data in the rounding process and the numbers of bits truncated in the bit truncation process for the average value Rave of the R data and the average value Gave of the G data depend on the magnitude relations between the differences $|R_A-R_B|$, $|G_A-G_B|$ and the threshold value $\beta$. For the average value Rave of the R data, when the difference $|R_A-R_B|$ of the R data is larger than the threshold value $\beta$, a value of four is added to the average value Rave of the R data and then the lower three bits of the average value Rave of the R data are truncated to calculate the R representative value. Otherwise, a value of two is added to the average value Rave of the R data and then the lower two bits of the average value Rave of the R data are truncated to calculate the R representative value. The same goes for the average value Gave of the G data. When the difference $|G_A-G_B|$ of the G data is larger than the threshold value $\beta$, a value of four is added to the average value Gave of the G data and then the lower three bits of the average value Gave of the G data are truncated to calculate the G representative value. Otherwise, a value of two is added to the average value Gave of the G data and then the lower two bits of the average value Gave of the G data are truncated to calculate the G representative value.

For the B representative value, on the other hand, a value of four is added to the average value Bave of the B data and then the lower three bits of the average value Bave of the B data are truncated to calculate the B representative value. This completes the compression process for the image data of pixels A and B.

For pixels C and D (which are poorly correlated with each other), on the other hand, the same process as the (1×4) compression process is performed. A quantization process using dither values is individually performed for pixels C and D to achieve bit reduction of the R, G and B data of pixels C and D. In detail, dither values are first added to the R data $R_C$, $R_D$, G data $G_C$, $G_D$, and B data $B_C$ and $B_D$ of pixels C and D. As described above, the dither values are calculated from the block coordinates $x_{BLK}$ and $y_{BLK}$ of the compression target block. In FIG. 21A, the (2+1×2) compression process is illustrated with an assumption that the dither values E2 and E3, calculated for pixels C and D, are 10 and 15, respectively.

This is followed by performing rounding or bit truncation to generate the $R_C{}^*$, $G_C{}^*$, and $B_C{}^*$data and the $R_D{}^*$, $G_D{}^*$, and $B_D{}^*$data. More specifically, a value of 8 is added to the R data, G data, and B data of pixels C and D with the dither values E2 and E3 added thereto, and this is followed by bit truncation of the lower four bits. This completes the calculation of the $R_C{}^*$, $G_C{}^*$, $B_C{}^*$data and the $R_D{}^*$, $G_D{}^*$, $B_D{}^*$data.

The (2+1×2) compressed data $D_{CMP3}$ is finally generated by attaching the compression process identification data and the pattern recognition data to the R, G, and B representative values, the $\beta$ comparison data, the magnitude relation data, the $R_C{}^*$, $G_C{}^*$, $B_C{}^*$data, the $R_D{}^*$, $G_D{}^*$, and $B_D{}^*$data which are generated as described above.

Next, a description is given of data processing in the decompression process of the (2+1×2) compressed data $D_{CMP3}$ with reference to FIG. 21B. In the following, a description is given of the case when pixels A and B are highly correlated with each other, and pixels C and D are poorly correlated with each other and also poorly correlated with pixels A and B. A person skilled in the art would understand that the (2+1×2) compressed data $D_{CMP3}$ can be decompressed in a similar manner for other cases.

First, a description is given of the decompression process for pixels A and B (which are highly correlated). In the decompression process for pixels A and B, an inverse quantization process using a dither value is performed on the R representative value, G representative value and B representative value. More specifically, a left shift is first performed on the R representative value, G representative value and B representative value. The numbers of bits of the left shift performed on the R representative value and G representative value respectively depend on the magnitude relation between the differences $|R_A-R_B|$ and the threshold value $\beta$ and the magnitude relation between the differences $|G_A-G_B|$ and the threshold value $\beta$, which are described in the $\beta$ comparison data. When the difference $|R_A-R_B|$ between the R data is larger than the threshold value $\beta$, a left shift of three bits is performed on the R representative value; otherwise a left shift of two bits is performed. Similarly, when the difference $|G_A-G_B|$ between the R data is larger than the threshold value $\beta$, a left shift of three bits is performed on the G representative value; otherwise a left shift of two bits is performed. Additionally, a left shift of three bits is performed on the B representative value, independently of the $\beta$ comparison data.

This is followed by subtracting a dither value from the left-shifted R representative value, G representative value and B representative value. In the present example, the dither value is calculated from the block coordinates $x_{BLK}'$ and $y_{BLK}'$ of the decompression target block. The dither value may be calculated, for example, as the lower four bits of the pseudo-random number V0' or V1' calculated in accordance with expression (6a) or (6b) on the basis of the coordinates of one of pixels A and B (which are highly correlated). Illustrated in FIG. 21B is the example in which the dither value E0' calculated from the coordinates of pixel A is used for the inverse quantization process of the R representative value, G representative value and B representative value and the dither value E0' is calculated as "0". This completes the inverse quantization process of the R representative value, G representative value and B representative value.

The value obtained by performing the above-described inverse quantization process (the left shift and subtraction of the dither value) on the R representative value may be hereinafter referred to as the inverse-quantized R representative value. Similarly, the value obtained by performing the above-described inverse quantization process on the G representative value may be hereinafter referred to as the inverse-quantized G representative value and the value obtained by performing the above-described inverse quantization process on the B representative value may be hereinafter referred to as the inverse-quantized B representative value.

The R, G, and B data of pixels A and B are reproduced from the inverse-quantized R representative value, inverse-quantized G representative value and inverse-quantized B representative value.

The β comparison data and the magnitude relation data are used in the reproduction of the R data of pixels A and B. When the β comparison data describes that the difference $|R_A-R_B|$ between the R data is larger than the threshold value β, the value obtained by adding a constant value (for example, five) to the inverse-quantized R representative value is reproduced as the R data of the pixel which is described as having the larger R data in the magnitude relation data, and the value obtained by subtracting the constant value from the inverse-quantized R representative value is reproduced as the R data of the other pixel which is described as having the smaller R data in the magnitude relation data. When the difference $|R_A-R_B|$ between the R data is smaller than the threshold value β, on the other hand, the R data of pixels A and B are both reproduced as a value identical to the inverse-quantized R representative value.

A similar process is performed for the reproduction of the G data of pixels A and B, using the β comparison data and the magnitude relation data. In the reproduction of the B data of pixels A and B, on the other hand, the B data of pixels A and B are both reproduced as a value identical to the inverse-quantized B representative value, independently of the β comparison data and the magnitude relation data.

This completes the reproduction of the R data, G data and B data of pixels A and B.

In the decompression process for pixels C and D (which are poorly correlated with each other), on the other hand, a similar inverse quantization process to the decompression process of the (1×4) compressed data $D_{CMP2}$ is performed. In the decompression process for pixels C and D, a left shift of four bits is first performed on each of the $R_C$*data, $G_C$*data, $B_C$*data, $R_D$*data, $G_D$*data, and $B_D$*data. This is followed by subtracting the dither values E2' and E3' to reproduce the R, G, and B data of pixels C and D.

The reproduction of the image data of all of pixels A to D of the decompression target block, that is, the decompression of the (2+1×2) compressed data $D_{CMP3}$ is completed through the above-described procedure.

4. (2×2) Compression and Decompression Processes

FIG. 22 schematically illustrates the format of the (2×2) compressed data $D_{CMP4}$. As described above, the (2×2) compression process is used when image data of two pixels are highly correlated, and image data of the remaining two pixels are highly correlated. In the present implementation example, the (2×2) compressed data is a 48-bit data including: a compression process identification data, pattern recognition data, R representative value #1, G representative value #1, B representative value #1, R representative value #2, G representative value #2, B representative value #2, β comparison data, and magnitude relation data.

The compression process identification data indicate the used compression process and three bits are allocated to the compression process identification data in the (2×2) compressed data $D_{CMP4}$. In the present example, the value of the compression process identification data of the (2×2) compressed data $D_{CMP4}$ is "110".

The pattern recognition data is a 2-bit data indicating which two of pixels A to D are highly correlated. When the (2×2) compression process is used, two of pixels A to D (referred to as the first pixel pair, hereinafter) are highly correlated, and the other two pixels (referred to as the second pixel pair, hereinafter) are highly correlated. Accordingly, the number of possible combinations of highly-correlated two pixels is three as follows:

Pixels A and B are highly correlated, and pixels C and D are highly correlated.

Pixels A and C are highly correlated, and pixels B and D are highly correlated.

Pixels A and D are highly correlated, and pixels B and C are highly correlated.

The pattern recognition data indicates with 2 bits which of these three combinations the correlations of the four pixels of the compression target block fall into.

The R representative value #1, G representative value #1, and B representative value #1 are values representing the R data, G data, and B data of the two pixels of the first pixel pair, and the R representative value #2, G representative value #2, and B representative value #2 are values representing the R data, G data, and B data of the two pixels of the second pixel pair. In the example of FIG. 29, each of the R representative value #1, G representative value #1, B representative value #1, R representative value #2, and B representative value #2 is a 5-bit or 6-bit data, and the G representative value #2 is a 6-bit or 7-bit data.

The β comparison data indicates whether the difference between the R data of the highly-correlated two pixels, the difference between the G data of the highly-correlated two pixels, and the difference between the B data of the highly-correlated two pixels are larger than the predetermined threshold value β. In the present example, the β comparison data is a 6-bit data in which three bits are allocated to each of the first and second pixel pairs. On the other hand, the magnitude relation data indicates which of the two highly-correlated pixels has the larger R data, which of the two highly-correlated pixels has the larger G data, and which of the two highly-correlated pixels has the larger B data for each of the first and second pixels pairs. For each of the first and second pixel pairs, the magnitude relation data associated with the R data is generated only when the difference between the R data of the two pixels of the pixel pair is larger than the threshold value β. Correspondingly, for each of the first and second pixel pairs, the magnitude relation data associated with the G data is generated only when the difference between the G data of the two pixels of the pixel pair is larger than the threshold value β. The magnitude relation data associated with the B data is generated only when the difference between the B data of the two pixels of the pixel pair is larger than the threshold value β. Accordingly, the magnitude relation data is a 0- to 6-bit data.

In the following, a description is given of data processing in the (2×2) compression process with reference to FIG. 23A. In the following, a description is given of the generation of the (2×2) compressed data $D_{CMP4}$ when pixels A and B are highly correlated and pixels C and D are highly correlated. The first pixel pair is defined as including pixels A and B and the second pixel pair is defined as including pixels C and D. A person skilled in the art would understand that the (2×2) compressed data $D_{CMP4}$ can be generated in a similar manner for other cases.

The average values of the R data, G data and B data are first calculated for each of the first and second pixel pairs. In detail, the average values Rave1, Gave1, and Bave1 of the R data, G data, and B data of pixels A and B, and the average values Rave2, Gave2, and Bave2 of the R data, G data, and B data of pixels C and D are calculated in accordance with the following equations:

$$Rave1=(R_A+R_B+1)/2,$$

$$Gave1=(G_A+G_B+1)/2,$$

$$Bave1=(B_A+B_B+1)/2,$$

$$Rave2=(R_C+R_D+1)/2,$$

$$Gave2=(G_C+G_D+1)/2, \text{ and}$$

$$Bave2=(B_C+B_D+1)/2.$$

Furthermore, the difference $|R_A-R_B|$ between the R data of pixels A and B, the difference $|G_A-G_B|$ between the G data and the difference $|B_A-B_B|$ between the B data are then compared with the predetermined threshold value β. Similarly, the difference $|R_C-R_D|$ between the R data of pixels C and D, the difference $|G_C-G_D|$ between the G data and the difference $|B_C-B_D|$ between the B data are compared with the predetermined threshold value β. The β comparison data is generated to describe the results of these comparisons and incorporated into the (2×2) compressed data $D_{CMP4}$.

Furthermore, the magnitude relation data are generated for each of the first pixel pair (pixels A and B) and the second pixel pair (pixels C and D). The generated magnitude relation data is incorporated into the (2×2) compressed data $D_{CMP4}$.

In detail, when the difference $|R_A-R_B|$ between the R data of pixels A and B is larger than the threshold value β, the magnitude relation data is generated to describe which of pixels A and B has the larger R data. When the difference $|R_A-R_B|$ between the R data of pixels A and B is equal to or smaller than the threshold value β, the magnitude relation data is generated so as not to describe the magnitude relation between the R data of pixels A and B. Similarly, when the difference $|G_A-G_B|$ between the G data of pixels A and B is larger than the threshold value β, the magnitude relation data is generated to describe which of pixels A and B has the larger G data. When the difference $|G_A-G_B|$ between the G data of pixels A and B is equal to or smaller than the threshold value β, the magnitude relation data is generated so as not to describe the magnitude relation between the G data of pixels A and B. In addition, when the difference $|B_A-B_B|$ between the B data of pixels A and B is larger than the threshold value β, the magnitude relation data is generated to describe which of pixels A and B has the larger B data. When the difference $|B_A-B_B|$ between the B data of pixels A and B is equal to or smaller than the threshold value β, the magnitude relation data are generated so as not to describe the magnitude relation between the B data of pixels A and B.

Correspondingly, when the difference $|R_C-R_D|$ between the R data of pixels C and D is larger than the threshold value β, the magnitude relation data is generated to describe which of pixels C and D has the larger R data. When the difference $|R_C-R_D|$ between the R data of pixels C and D is equal to or smaller than the threshold value β, the magnitude relation data are generated so as not to describe the magnitude relation between the R data of pixels C and D. Similarly, when the difference $|G_C-G_D|$ between the G data of pixels C and D is larger than the threshold value β, the magnitude relation data is generated to describe which of pixels C and D has the larger G data. When the difference $|G_C-G_D|$ between the G data of pixels C and D is equal to or smaller than the threshold value β, the magnitude relation data are generated so as not to describe the magnitude relation between the G data of pixels C and D. Finally, when the difference $|B_C-B_D|$ between the B data of pixels C and D is larger than the threshold value β, the magnitude relation data is generated to describe which of pixels C and D has the larger B data. When the difference $|B_C-B_D|$ between the B data of pixels C and D is equal to or smaller than the threshold value β, the magnitude relation data is generated so as not to describe the magnitude relation between the B data of pixels C and D.

Furthermore, the R representative value #1, G representative value #1, B representative value #1, R representative value #2, G representative value #2, and B representative value #2 are calculated by performing a quantization process on the average values Rave1, Gave1, and Bave1 of the R, G, and B data of pixels A and B and the average values Rave2, Gave2, and Bave2 of the R, G, and B data of pixels C and D.

In the quantization process of the average values Rave1, Gave1, and Bave1, a dither value is added to the average values Rave1, Gave1, and Bave1 of the R, G, and B data of pixels A and B. In the present example, the dither value is calculated from the block coordinates $x_{BLK}$ and $y_{BLK}$ of the compression target block. The dither value used in the quantization process of the average values Rave1, Gave1, and Bave1 may be calculated as the lower four bits of the pseudo-random number V0 or V1 calculated from expression (3a) or (3b) by using the coordinates of one of pixels A and B. In the present example, a description is given with an assumption that the dither value E0 calculated from the coordinates of pixel A is used in the quantization process of the average values Rave1, Gave1, and Bave1 and the dither value E0 is calculated as "0".

Similarly, a dither value is added to the average values Rave2, Gave2, and Bave2 of the R, G, and B data of pixels C and D in the quantization process of the average values Rave2, Gave2, and Bave2. This dither value is also calculated from the block coordinates $x_{BLK}$ and $y_{BLK}$ of the compression target block. The dither value used in the quantization process performed on the average values Rave2, Gave2, and Bave2 may be calculated, for example, as the lower four bits of the pseudo-random number V2 or V3 calculated in accordance with expression (3c) or (3d) by using the coordinates of one of pixels C and D. In the present example, the dither value E2 calculated from the coordinates of pixel C is used in the quantization process of the average values Rave2, Gave2, and Bave2 and the dither value E2 is calculated as "10".

This is followed by performing rounding or bit truncation on the average values Rave1, Gave1, and Bave1, Rave2, Gave2, and Bave2 with the dither values added thereto to calculate the R representative values, G representative values, and B representative values. As for pixels A and B, the value which is added in the rounding process and the number of bits truncated in the bit truncation process is selected between two bits and three bits, depending on the magnitude relation between the difference $|R_A-R_B|$ and the threshold value β, the magnitude relation between the difference $|G_A-G_B|$ and the threshold value β, and the magnitude relation between the difference $|B_A-B_B|$ and the threshold value β. When the difference $|R_A-R_B|$ between the R data of pixels A and B is larger than the threshold value β, a value of four is added to the average value Rave1 of the R data, and then the lower three bits are truncated from the average value Rave1 to thereby calculate the R representative value #1. Otherwise, a value of two is added to the average value Rave1 and then the lower two bits are truncated from the average value Rave1 to thereby calculate the R representative value #1. As a result, the R representative value #1 is obtained as a 5-bit or 6-bit data. The same goes for the G data and B data. When the difference $|G_A-G_B|$ between the G data of pixels A and B is larger than the threshold value $\beta$, a value of four is added to the average value Gave1 of the G data, and then the lower three bits are truncated from the average value Gave1 to thereby calculate the G representative value #1. Otherwise, a value of two is added to the average value Gave1 and then the lower two bits are truncated from the average value Gave1 to thereby calculate the G representative value #1. Furthermore, when the difference $|B_A-B_B|$ between the B data of pixels A and B is larger than the threshold value $\beta$, a value of four is added to the average value Bave1 of the B data and then the lower three bits are truncated from the average value Bave1 to thereby calculate the B representative value #1. Otherwise, a value of two is added to the average value Bave1 and then the lower two bits are truncated from the average value Bave1 to thereby calculate the B representative value #1.

A similar process is performed for the pair of pixels C and D to calculate the R representative value #2, G representative value #2 and B representative value #2. It should be noted however that for the G data of pixels C and D, the value which is added in the rounding process and the number of bits truncated in the bit truncation process are one bit or two bits. When the difference $|G_C-G_C|$ between the G data of pixels C and D is larger than the threshold value $\beta$, a value of two is added to the average value Gave2 of the G data, and then the lower two bits are truncated from the average value Gave2 to thereby calculate the G representative value #2. Otherwise, a value of one is added to the average value Gave2 and then the lower one bit is truncated from the average value Gave2 to thereby calculate the G representative value #2.

The above-described procedure completes the (2×2) compression process.

Figure 23B:
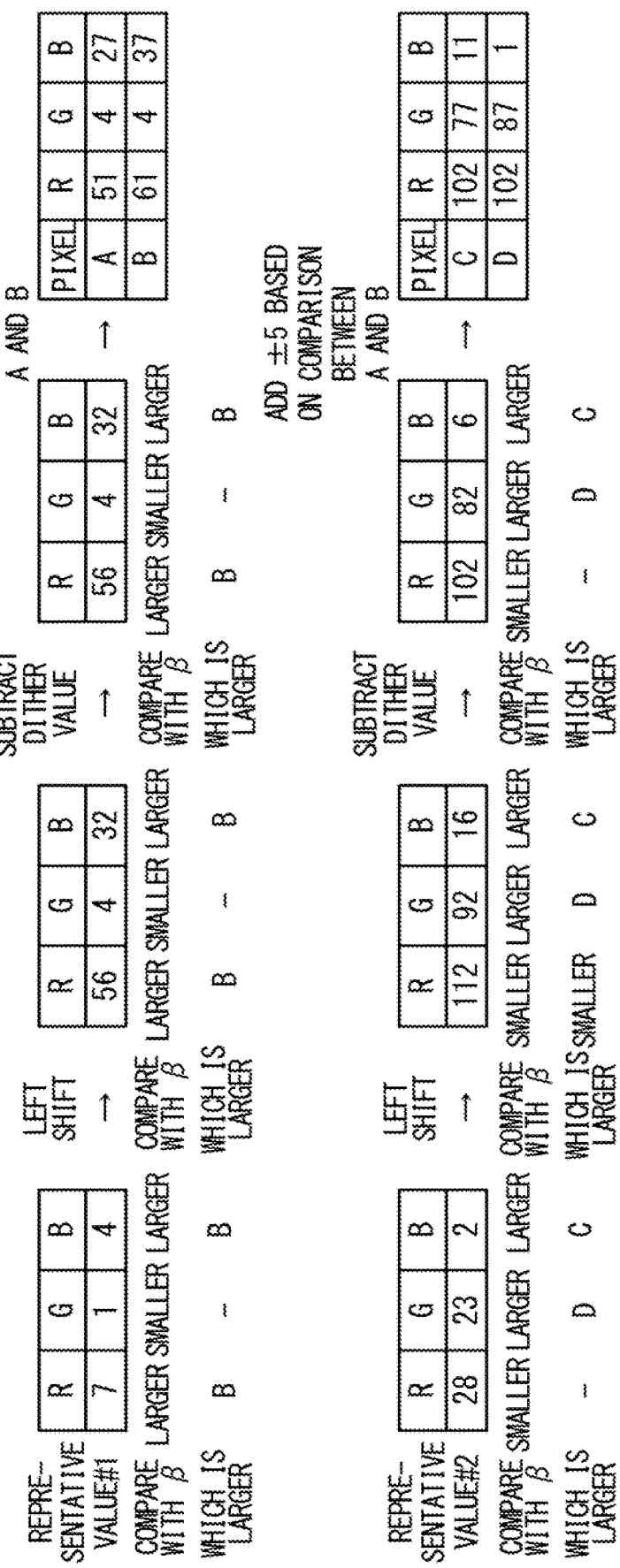
FIG. 23B schematically illustrates data processing in decompression processing performed on a compressed image data compressed through a (2×2) compression process.

Next, a description is given of data processing in the decompression process of the (2×2) compressed data $D_{CMP4}$ with reference to FIG. 23B. In the following, a description is given of the decompression process of the (2×2) compressed data $D_{CMP4}$ for the case when pixels A and B are highly correlated and pixels C and D are highly correlated. A person skilled in the art would understand that the (2×2) compressed data $D_{CMP4}$ can be decompressed in a similar manner for other cases.

In the decompression process performed on the (2×2) compressed data $D_{CMP4}$, an inverse quantization process using a dither value is performed on the R representative value #1, G representative value #1 and B representative value #1.

More specifically, a left shift is first performed on the R representative value #1, G representative value #1, and B representative value #1. The number of bits of the left shift depends on the magnitude relations between the threshold value $\beta$ and the differences $|R_A-R_B|$, $|G_A-G_B|$, and $|B_A-B_B|$ of the R data, G data and B data of pixels A and B, which are described in the $\beta$ comparison data. When the difference $|R_A-R_B|$ between the R data of pixels A and B is larger than the threshold value $\beta$, a left shift of three bits is performed on the R representative value #1, and otherwise a left shift of two bits is performed on the R representative value #1. Similarly, when the difference $|G_A-G_B|$ between the G data of pixels A and B is larger than the threshold value $\beta$, a left shift of three bits is performed on the G representative value #1, and otherwise a left shift of two bits is performed on the G representative value #1. Furthermore, when the difference $|B_A-B_B|$ between the B data of pixels A and B is larger than the threshold value $\beta$, a left shift of three bits is performed on the B representative value #1, and otherwise a left shift of two bits is performed on the B representative value #1.

A similar left shift is performed on the R representative value #2, the G representative value #2 and the B representative value #2. It should be noted however that the number of bits of the left shift of the G representative value #2 is selected between one bit and two bits. When the difference $|G_C-G_D|$ between the G data of pixels C and D is larger than the threshold value $\beta$, a left shift of two bits is performed on the G representative value #2, and otherwise a left shift of one bit is performed on the G representative value #2.

This is followed by subtracting dither values from the left-shifted R representative value #1, G representative value #1, B representative value #1, R representative value #2, G representative value #2 and B representative value #2. In the present example, the dither values are calculated from the block coordinates $x_{BLK}'$ and $y_{BLK}'$ of the decompression target block. The dither value used in the inverse quantization process of the R representative value #1, G representative value #1, B representative value #1 associated with pixels A and B may be calculated, for example, as the lower four bits of the pseudo-random number V0' or V1' calculated in accordance with expression (6a) or (6b) by using the coordinates of one of pixels A and B. Illustrated in FIG. 23B is the example in which the dither value E0' calculated from the coordinates of pixel A is used in the inverse quantization process of the R representative value #1, G representative value #1, B representative value #1 and the dither value E0' is calculated as "0". The dither value used in the inverse quantization process of the R representative value #2, G representative value #2, B representative value #2 associated with pixels C and C may be calculated, for example, as the lower four bits of the pseudo-random number V2' or V3' calculated in accordance with expression (6c) or (6d) by using the coordinates of one of pixels C and D. Illustrated in FIG. 23B is the example in which the dither value E2' calculated from the coordinates of pixel C is used in the inverse quantization process of the R representative value #2, G representative value #2 and B representative value #2 and the dither value E2' is calculated as "10". This completes the inverse quantization of the R representative value #1, G representative value #1, B representative value #1, R representative value #2, G representative value #2, and B representative value #2.

The values obtained by performing the above-described inverse quantization process (left shift and subtraction of the dither value) on the R representative value #1, G representative value #1, B representative value #1 may be hereinafter referred to as inverse-quantized R representative value #1, inverse-quantized G representative value #1, and inverse-quantized B representative value #1, respectively. Similarly, the values obtained by performing the above-described inverse quantization process (left shift and subtraction of the dither value) on the R representative value #2, G representative value #2, B representative value #2 may be hereinafter referred to as inverse-quantized R representative value #2, inverse-quantized G representative value #2, and inverse-quantized B representative value #2, respectively.

The R, G, B data of pixels A and B are reproduced from the inverse-quantized R representative value #1, inverse-quantized G representative value #1, and inverse-quantized B representative value #1 and the R, G, B data of pixels C and D are reproduced from the inverse-quantized R representative value #2, inverse-quantized G representative value #2, and inverse-quantized B representative value #2.

The β comparison data and the magnitude relation data are used in the reproduction of the R, G, and B data of each pixel. When the β comparison data describes that the difference |R$_A$−R$_B$| between the R data of pixels A and B is larger than the threshold value β, the value obtained by adding a constant value (for example, five) to the inverse-quantized R representative value #1 is reproduced as the R data of one of pixels A and B, which is described as having the larger R data in the magnitude relation data, and the value obtained by subtracting the constant value from the inverse-quantized R representative value #1 is reproduced as the R data of the other one, which is described as having the smaller R data in the magnitude relation data. When the difference |R$_A$−R$_B$| between the R data of pixels A and B is smaller than the threshold value β, the R data of pixels A and B are both reproduced as the value identical to the inverse-quantized R representative value #1. The G and B data of pixels A and B, and the R, G, and B data of pixels C and D are also reproduced through a similar procedure.

The reproduction of the R data, G data and B data of pixels A to D of the decompression target block, that is, the decompression of the (2×2) compressed data D$_{CMP4}$ is completed through the above-described procedure.

5. (4×1) Compression and Decompression Processes

FIG. 24 schematically illustrates the format of the (4×1) compressed data D$_{CMP5}$. As described above, the (4×1) compression process is used when the image data of the four pixels A to D are highly correlated. In the (4×1) compression process, a similar process to that performed by the compression processing circuit 5 of the block compression circuitry 1 illustrated in FIG. 5 is performed. In the decompression process of the (4×1) compressed data D$_{CMP5}$, a similar decompression process to that performed by the decompression processing circuit 7 of the block decompression circuitry 2 illustrated in FIG. 6 is performed.

In the present example, as illustrated in FIG. 24, the (4×1) compressed data D$_{CMP5}$ includes a compression process identification data, minimum value data Ymin, three of luminance difference data Ydist0 to Ydist3, address data Yaddress, and averaged color difference data Cb' and Cr'. The (4×1) compressed data D$_{CMP5}$ is a 48-bit data. Although FIG. 24 illustrates the format for the case when the (4×1) compressed data D$_{CMP5}$ includes three luminance difference data Ydist1 to Ydist3, the (4×1) compressed data D$_{CMP5}$ may include a different combination of three of the four luminance difference data Ydist0 to Ydist3 (for example, Ydist0, Ydist1, and Ydist2).

The compression process identification data indicates the used compression process and four bits are allocated to the compression process identification data in the (4×1) compressed data D$_{CMP5}$. In the present example, the value of the compression process identification data of the (4×1) compressed data D$_{CMP5}$ is "1110".

The minimum value data Ymin, the luminance difference data Ydist0 to Ydist3, the address data Yaddress, and the averaged color difference data Cb' and Cr' are obtained through converting the R, G, and B data of pixels A to D into YUV data through YUV conversion, and performing a compression process on the YUV data. As described above, the minimum value data Ymin and the luminance difference data Ydist0 to Ydist3 are obtained from the luminance data of the YUV data of the four pixels and the averaged color difference data Cb' and Cr' are obtained from the color difference data of the YUV data. Ymin, three of Ydist0 to Ydist3 and Cb' and Cr' are representative values of pixels A to D. In the present example, 10 bits are allocated to the minimum value data Ymin, four bits are allocated to each of the luminance difference data Ydist0 to Ydist3, two bits are allocated to the address data Yaddress and 10 bits are allocated to each of the averaged color difference data Cb' and Cr'.

Next, a description is given of data processing in the (4×1) compression process with reference to FIG. 25A. First, the matrix operation in accordance with the above-described expressions (2a) to (2d) is performed on the R, G and B data of each of pixels A to D to calculate the luminance data Y and the color difference data Cr and Cb for each of pixels A to D. As described above, Y0, Cb0, and Cr0 in expression (2a) represent the luminance data Y and the color difference data Cb and Cr of pixel A, respectively, and Y1, Cb1, and Cr1 in expression (2b) represent the luminance data Y and the color difference data Cb and Cr of pixel B, respectively. Y2, Cb2, and Cr2 in expression (2c) represent the luminance data Y and the color difference data Cb and Cr of pixel C, respectively, and Y3, Cb3, and Cr3 in expression (2d) represent the luminance data Y and the color difference data Cb and Cr of pixel D, respectively. The luminance data Y0 to Y3, the color difference data Cb0 to Cb3 and Cr0 to Cr3 are 10-bit data.

This is followed by generating the minimum value data Ymin, the luminance difference data Ydist0 to Ydist3, the address data Yaddress, and the averaged color difference data Cb' and Cr' from the luminance data Y and color difference data Cr and Cb of pixels A to D.

The minimum value data Ymin is determined as the smallest one of the luminance data Y0 to Y3 of pixels A, B, C, and D. When the luminance data Y0 is the smallest of the luminance data Y0 to Y3, the minimum value Ymin is determined as being equal to the luminance data Y0.

The averaged color difference data Cb' is calculated by calculating the sum of the color difference data Cb of pixels A, B, C, and D and truncating the lower two bits of the calculated sum (that is, dividing the sum by four). Similarly, the averaged color difference data Cr' is calculated by calculating the sum of the color difference data Cr of pixels A, B, C, and D and truncating the lower two bits of the calculated sum (that is, dividing the sum by four).

The luminance difference data Ydist0 to Ydist3 are calculated by performing a quantization process on the differences respectively obtained by subtracting the minimum value data Ymin from the luminance data Y0 to Y3, the quantization process using the dither values E0 to E3. More specifically, the luminance difference data Ydist0 to Ydist3 are calculated as follows:

The luminance difference data Ydist0 is calculated by calculating the difference Y0−Ymin obtained by subtracting the minimum value data Ymin from the luminance data Y0 and performing a quantization process which involves calculating the sum of the difference Y0−Ymin and the dither value E0 and truncating the lower six bits of the obtained sum Y0−Ymin+E0. In other words, the luminance difference data Ydist0 is calculated in accordance with the following expression (9a):

$$Ydist0=(Y0-Ymin+E0)>>6. \qquad (9a)$$

Similarly, the luminance difference data Ydist1 to Ydist3 are calculated in accordance with the following expressions (9b) to (9d):

$$Ydist1=(Y1-Ymin+E1)>>6, \qquad (9b)$$

$$Ydist2=(Y2-Ymin+E2)>>6, \text{ and} \qquad (9c)$$

$$Ydist3=(Y3-Ymin+E3)>>6. \qquad (9d)$$

The dither value E0, which is associated with pixel A, is generated as lower eight bits of a pseudo-random number V0 generated by using as seed values the coordinates $x_A$ and $y_A$ of pixel A of the compression target block (for example, the pseudo-random number V0 generated in accordance with the above-described expression (3a)). It should be noted that the coordinates $x_A$ and $y_A$ of pixel A can be determined from the block coordinates $x_{BLK}$ and $y_{BLK}$ of the compression target block. Similarly, the dither value E1, which is associated with pixel B, is generated as lower eight bits of a pseudo-random number V1 generated by using as seed values the coordinates $x_B$ and $y_B$ of pixel B of the compression target block (for example, the pseudo-random number V1 generated in accordance with the above-described expression (3b)). Furthermore, the dither value E2, which is associated with pixel C, is generated as lower eight bits of a pseudo-random number V2 generated by using as seed values the coordinates $x_C$ and $y_C$ of pixel C of the compression target block (for example, the pseudo-random number V2 generated in accordance with the above-described expression (3c)). Finally, the dither value E3, which is associated with pixel D, is generated as lower eight bits of a pseudo-random number V3 generated by using as seed values the coordinates $x_D$ and $y_D$ of pixel D of the compression target block (for example, the pseudo-random number V3 generated in accordance with the above-described expression (3d)).

The (4×1) compressed data $D_{CMP5}$ includes three of the luminance difference data Ydist0 to Ydist3, which are calculated from three of the luminance data Y0 to Y3 other than the smallest one of the luminance data Y0 to Y3. When the luminance data Y0 is the smallest of the luminance data Y0 to Y3, The (4×1) compressed data $D_{CMP5}$ includes the luminance difference data Ydist1 to Ydist3 (other than the luminance difference data Ydist0).

The address data Yaddress is generated as a data which indicates the pixel having the smallest luminance data of pixels A to D (that is, the data which indicates which of the luminance data Y0 to Y3 is the smallest). When the luminance data Y0 is the smallest of the luminance data Y0 to Y3, for example, the address data Yaddress is generated to include information indicating that the luminance data Y0 associated with pixel A is the smallest.

The (4×1) compressed data $D_{CMP5}$ is generated to incorporate the thus-generated minimum value data Ymin, averaged color difference data Cb', Cr', three of the luminance difference data Ydist0 to Ydist3, and address data Yaddress. This completes the (4×1) compression process.

Next, a description is given of data processing in the decompression process of the (4×1) compressed data $D_{CMP5}$. First, the luminance data Y0', Y1', Y2', and Y3' of pixels A, B, C, and D of the decompression target block are reproduced from the minimum value data Ymin, three of the luminance difference data Ydist0 to Ydist3 and address data Yaddress, which are included in the (4×1) compressed data $D_{CMP5}$.

First, the minimum value data Ymin included in the (4×1) compressed data $D_{CMP5}$ is determined as the luminance data of the pixel indicated by the address data Yaddress. When the address data Yaddress indicates that the luminance data of pixel A is the smallest, the minimum data Ymin is determined as the luminance data Y0' of pixel A. When the address data Yaddress indicates that the luminance data of a different pixel is the smallest, the luminance data of the different pixel is determined in a similar manner.

The luminance data of the remaining three pixels are reproduced from the minimum value data Ymin and data obtained by performing an inverse quantization process using dither values on the three luminance difference data included in the (4×1) compressed data $D_{CMP5}$ (three of the luminance difference data Ydist0 to Ydist3).

More specifically, the luminance data of the remaining three pixels are calculated in accordance with the three expressions associated with the remaining three pixels of the following expressions (10a) to (10d):

$$Y0' = Ydist0 \ll m - E0' + Ymin, \tag{10a}$$

$$Y1' = Ydist1 \ll m - E1' + Ymin, \tag{10b}$$

$$Y1' = Ydist2 \ll m - E2' + Ymin, \text{ and} \tag{10c}$$

$$Y3' = Ydist3 \ll m - E3' + Ymin, \tag{10d}$$

where expressions (10a), (10b), (10c) and (10d) are used for calculating the luminance data Y0', Y1', Y2' and Y3', respectively. The operator "<<m" in expressions (10a) to (10d) is an operator indicating a left shift of m bits.

When the address data Yaddress indicates that the luminance data of pixel A is the smallest, for example, the (4×1) compressed data $D_{CMP5}$ includes the luminance difference data Ydist1 to Ydist3 and the luminance data Y1', Y2', and Y3' of pixels B, C and D (the pixels other than pixel A) are reproduced in accordance with expressions (10b) to (10d). When the address data Yaddress indicates that the luminance data of a different pixel is the smallest, the luminance data of the remaining three pixels are reproduced in a similar manner.

The dither value E0' associated with pixel A is generated as the lower eight bits of a pseudo-random number V0' generated using the coordinates $x_A'$ and $y_A'$ of pixel A of the decompression target block as seed values (for example, the pseudo-random number V0' generated in accordance with the above-described expression (5a)). It should be noted that the coordinates $x_A'$ and $y_A'$ of pixel A of the decompression target block can be determined from the block coordinates $x_{BLK}'$ and $y_{BLK}'$ of the decompression target block. Similarly, the dither value E1' associated with pixel B is generated as the lower eight bits of a pseudo-random number V1' generated using the coordinates $x_B'$ and $y_B'$ of pixel B of the decompression target block as seed values (for example, the pseudo-random number V1' generated in accordance with the above-described expression (5b)). Furthermore, the dither value E2' associated with pixel C is generated as the lower eight bits of a pseudo-random number V2' generated using the coordinates $x_C'$ and $y_C'$ of pixel C of the decompression target block as seed values (for example, the pseudo-random number V2' generated in accordance with the above-described expression (5c)). Finally, the dither value E3' associated with pixel D is generated as the lower eight bits of a pseudo-random number V3' generated using the coordinates $x_D'$ and $y_D'$ of pixel D of the decompression target block as seed values (for example, the pseudo-random number V3' generated in accordance with the above-described expression (5d)).

The above-described processing achieves reproduction of the luminance data Y0' to Y3' of pixels A to D of the decompression target block.

On the other hand, the averaged color difference data Cb' and Cr' included in the (4×1) compressed data $D_{CMP5}$ are used as the color difference data Cb and Cr for all of pixels A to D without change.

This is followed by generating decompressed image data $D_{IMG5}'$ by performing YCbCr-RGB conversion on the luminance data Y0' to Y3' and the color difference data (that is, the averaged color difference data Cb' and Cr') of pixels A to D. In the present example, The R, G, and B data of the image data $D_A'$, $D_B'$, $D_C'$, and $D_D'$ associated with pixels A, B, C, and D of the decompression target block are reproduced through the YCbCr-RGB conversion in accordance with the above-described expressions (8a) to (8d). As described above, $R_A'$, $G_A'$, and $B_A'$ in expressions (8a) to (8d) are R, G, and B data included in the image data $D_A'$ associated with pixel A, $R_B'$, $G_B'$, and $B_B'$ are R, G, and B data included in the image data $D_B'$ associated with pixel B, $R_C'$, $G_C'$, and $B_C'$ are R, G, and B data included in the image data $D_C'$ associated with pixel C and $R_D'$, $G_D'$, and $B_D'$ are R, G, and B data included in the image data $D_D'$ associated with pixel D.

The above-described procedure completes reproduction of the R, G, and B data of pixels A to D of the decompression target block, that is, decompression of the (4×1) compressed data $D_{CMP5}$.

Although embodiments and examples of the present disclosure have been described in the above, the present invention must not be construed as being limited to the above-described embodiments and examples. A person skilled in the art would appreciate that the present invention may be implemented with various modifications.

What is claimed is:

1. An image compression device, comprising:
a first compression processing circuit configured to generate compressed image data by performing a block compression process on image data comprising grayscale values for a plurality of pixels; and
a dither value generator circuit configured to:
generate first dither values for a first compression target block at least partially based on first block coordinates indicating a horizontal and vertical position of the first compression target block within an image corresponding to the image data when first compressed image data of the compressed image data associated with the first compression target block is generated, wherein the first compression target block corresponds to a first two or more pixels of the plurality of pixels; and
generate second dither values for a second compression target block at least partially based on second block coordinates indicating a horizontal and vertical position of the second compression target block within the image when second compressed image data of the compressed image data associated with the second compression target block is generated, wherein the second compression target block corresponds to a second two or more pixels of the plurality of pixels and the horizontal and vertical position of the second compression target block is different from the horizontal and vertical position of the first compression target block, and
wherein the first compression processing circuit is further configured to perform a first quantization process using the first dither values and the second dither values in the block compression process.

2. The image compression device according to claim 1, wherein the first dither values include a plurality of dither values associated with respective pixels of the first compression target block, wherein the dither value generator circuit is configured to generate pseudo-random numbers using as seed values coordinates of the respective pixels obtained from the first block coordinates and generate the first dither values associated with the respective pixels from the pseudo-random numbers.

3. The image compression device according to claim 1, further comprising:
second to $N^{th}$ compression processing circuits configured to generate second to $N^{th}$ compressed image data by performing second to $N^{th}$ block compression processes on the image data, respectively, N being an integer of three or more; and
a compressed data selection circuit configured to output a selected one of the second to $N^{th}$ compressed image data as an output compressed image data,
wherein the second to $N^{th}$ block compression processes are different from each other, and
wherein the second to $N^{th}$ compression processing circuits are configured to each perform a second quantization process using at least one of the first dither values and the second dither values in the second to $N^{th}$ block compression processes, respectively.

4. The image compression device according to claim 3, wherein the output compressed image data is selected from the second to $N^{th}$ compressed image data in response to a feature of the image data of at least one of the first compression target block and the second compression target block.

5. An image decompression circuit, comprising:
a first decompression processing circuit configured to generate decompressed image data by performing a first decompression process on compressed image data generated through a block compression process, wherein the decompressed image data comprises grayscale values for a plurality of pixels; and
a dither value generator circuit configured to:
generate first dither values for a first decompression target block at least partially based on first block coordinates indicating a horizontal and vertical position of the first decompression target block in an image corresponding to the decompressed image data when first decompressed image data of the decompressed image data associated with the first decompression target block is generated, wherein the first decompression target block corresponds to a first two or more pixels of the plurality of pixels; and
generate second dither values for a second decompression target block at least partially based on second block coordinates indicating a horizontal and vertical position of the second decompression target block in the image when second decompressed image data of the decompressed image data associated with the second decompressed target block is generated, wherein the second decompression target block corresponds to a second two or more pixels of the plurality of pixels and the horizontal and vertical position of the second decompression target block is different from the horizontal and vertical position of the first decompression target block, and
wherein the first decompression processing circuit is further configured to perform a first inverse quantization process using at least one of the first dither values and the second dither values in the first decompression process.

6. The image decompression circuit according to claim 5, wherein the first dither values includes a plurality of dither values associated with respective pixels of the first decompression target block,
wherein the dither value generator circuit is configured to generate pseudo-random numbers using as seed values coordinates of the respective pixels obtained from the first block coordinates and generate the first dither values associated with the respective pixels from the pseudo-random numbers.

7. The image decompression circuit according to claim 5, further comprising:
    second to $N^{th}$ decompression processing circuits configured to generate second to $N^{th}$ decompressed image data by performing second to $N^{th}$ block decompression processes on the compressed image data, respectively, N being an integer of three or more; and
    a decompressed data selection circuit configured to output a selected one of the second to $N^{th}$ decompressed image data as an output decompressed image data,
    wherein the second to $N^{th}$ decompression processes are different from each other, and
    wherein the second to $N^{th}$ decompression processing circuits are configured to each perform a second inverse quantization process using at least one of the first dither values and the second dither values in the second to $N^{th}$ decompression processes, respectively.

8. An image compression and decompression system, comprising:
    block compression circuitry configured to generate compressed image data by performing a block compression process on image data comprising grayscale values for a plurality of pixels; and
    block decompression circuitry configured to generate a decompressed image data by performing a decompression process adapted to the block compression process on the compressed image data,
    wherein, when the compressed image data associated with a first compression target block and a second compression target block is generated, the block compression circuitry is configured to:
        generate first dither values for the first compression target block at least partially based on first block coordinates indicating a horizontal and vertical position of the first compression target block in a first image corresponding to the image data, wherein the first compression target block corresponds to a first two or more pixels of the plurality of pixels;
        generate second dither values for the second compression target block at least partially based on second block coordinates indicating a horizontal and vertical position of the second compression target block in the first image, wherein the second compression target block corresponds to a second two or more pixels of the plurality of pixels and the horizontal and vertical position of the second compression target block is different from the horizontal and vertical position of the first compression target block; and
        perform a quantization process using the first dither values and the second dither values, and
    wherein, when the decompressed image data associated with a decompression target block is generated, the block decompression circuitry is configured to generate third dither values based on third block coordinates indicating a position of the decompression target block in a second image and perform an inverse quantization process using the third dither values.

9. The image compression and decompression system of claim 8, wherein the first dither values include a plurality of dither values associated with respective pixels of the first compression target block, wherein the block compression circuitry is configured to generate pseudo-random numbers using as seed values coordinates of the respective pixels obtained from the first block coordinates and generate the first dither values associated with the respective pixels from the pseudo-random numbers.

10. The image compression and decompression system of claim 8, further comprising:
    second to $N^{th}$ compression processing circuits configured to generate second to $N^{th}$ compressed image data by performing second to $N^{th}$ block compression processes on the image data, respectively, N being an integer of three or more; and
    a compressed data selection circuit configured to output a selected one of the second to $N^{th}$ compressed image data as an output compressed image data,
    wherein the second to $N^{th}$ block compression processes are different from each other, and
    wherein the second to $N^{th}$ compression processing circuits are configured to each perform a second quantization process using at least one of the first dither values and the second dither values in the second to $N^{th}$ block compression processes, respectively.

11. The image compression and decompression system of claim 10, wherein the output compressed image data is selected from the second to $N^{th}$ compressed image data in response to a feature of the image data of at least one of the first compression target block and the second compression target block.

12. A display driver for driving a display panel, comprising:
    block compression circuitry configured to generate compressed image data by performing a block compression process on image data comprising grayscale values for a plurality of pixels;
    a display memory storing the compressed image data;
    block decompression circuitry configured to generate a decompressed image data by performing a decompression process adapted to the block compression process on the compressed image data read out from the display memory; and
    drive circuitry configured to drive the display panel in response to the decompressed image data,
    wherein, when the compressed image data associated with a first compression target block and a second compression target block is generated, the block compression circuitry is configured to:
        generate first dither values for the first compression target block at least partially based on first block coordinates indicating a horizontal and vertical position of the first compression target block in a first image, wherein the first compression target block corresponds to a first two or more pixels of the plurality of pixels;
        generate second dither values for the second compression target block at least partially based on second block coordinates indicating a horizontal and vertical position of the second compression target block in the first image, wherein the second compression target block corresponds to a second two or more pixels of the plurality of pixels and the horizontal and vertical position of the second compression target block is different from the horizontal and vertical position of the first compression target block; and
        perform a quantization process using the first dither values and the second dither values, and
    wherein, when the decompressed image data associated with a decompression target block is generated, the block decompression circuitry is configured to generate third dither values based on third block coordinates indicating a horizontal and vertical position of the decompression target block in a second image and perform an inverse quantization process using the third dither values.

13. The display driver of claim 12, wherein the first dither values include a plurality of dither values associated with respective pixels of the first compression target block, wherein the block compression circuitry is further configured to generate pseudo-random numbers using as seed values coordinates of the respective pixels obtained from the first block coordinates and generate the first dither values associated with the respective pixels from the pseudo-random numbers.

14. The display driver of claim 12, further comprising:
second to $N^{th}$ compression processing circuits configured to generate second to $N^{th}$ compressed image data by performing second to $N^{th}$ block compression processes on the image data, respectively, N being an integer of three or more; and
a compressed data selection circuit configured to output a selected one of the second to $N^{th}$ compressed image data as an output compressed image data,
wherein the second to $N^{th}$ block compression processes are different from each other, and
wherein the second to $N^{th}$ compression processing circuits are configured to each perform a second quantization process using at least one of the first dither values and the second dither values in the second to $N^{th}$ block compression processes, respectively.

15. The display driver of claim 14, wherein the output compressed image data is selected from the second to $N^{th}$ compressed image data in response to a feature of the image data of at least one of the first compression target block and the second compression target block.

16. A display driver for driving a display panel, comprising:
a decompression processing circuit configured to generate a decompressed image data by performing a decompression process on a compressed image data generated through a block compression process, the decompressed image data comprises grayscale values for a plurality of pixels;
drive circuitry driving the display panel in response to the decompressed image data; and
a dither value generator circuit configured to:
generate first dither values for a first decompression target block at least partially based on first block coordinates indicating a horizontal and vertical position of the first decompression target block within an image corresponding to the decompressed image data when first decompressed image data of the decompressed image data associated with the first decompression target block is generated, wherein the first decompression target block corresponds to a first two or more pixels of the plurality of pixels; and
generate second dither values for a second decompression target block at least partially based on second block coordinates indicating a horizontal and vertical position of the second decompression target block within the image when second decompression image data of the decompressed image data associated with the second decompressed target block is generated, wherein the second decompression target block corresponds to a second two or more pixels of the plurality of pixels and the horizontal and vertical position of the second decompression target block is different from the horizontal and vertical position of the first decompression target block, and
wherein the decompression processing circuit is further configured to perform an inverse quantization process using at least one of the first dither values and the second dither values in the decompression process.

17. The display driver of claim 16, wherein the first dither values a plurality of dither values associated with respective pixels of the decompression target block,
wherein the dither value generator circuit is configured to generate pseudo-random numbers using as seed values coordinates of the respective pixels obtained from the first block coordinates and generate the first dither values associated with the respective pixels from the pseudo-random numbers.

18. The display driver of claim 16, further comprising:
second to $N^{th}$ decompression processing circuits configured to generate second to $N^{th}$ decompressed image data by performing second to $N^{th}$ block decompression processes on the compressed image data, respectively, N being an integer of three or more; and
a decompressed data selection circuit configured to output a selected one of the second to $N^{th}$ decompressed image data as an output decompressed image data,
wherein the second to $N^{th}$ decompression processes are different from each other, and
wherein the second to $N^{th}$ decompression processing circuits are configured to each perform a second inverse quantization process using at least one of the first dither values and the second dither values in the second to $N^{th}$ decompression processes, respectively.

* * * * *

UNITED STATES PATENT AND TRADEMARK OFFICE
CERTIFICATE OF CORRECTION

PATENT NO. : 10,609,401 B2  
APPLICATION NO. : 15/594173  
DATED : March 31, 2020  
INVENTOR(S) : Hirobumi Furihata and Masao Orio Page 1 of 1

It is certified that error appears in the above-identified patent and that said Letters Patent is hereby corrected as shown below:

In the Specification

Column 11, Line 10, Delete "$V_{BLK}$" and insert -- $Y_{BLK}$ --, therefor.

Column 15, Line 18, Delete "$D_{IMG}'$" and insert -- $D_{IMG1}'$ --, therefor.

Column 15, Line 18, Delete "$D_{IMG}'$" and insert -- $D_{IMG3}'$ --, therefor.

Column 31, Line 11, Delete "block." and insert -- block coordinates $X_{BLK}$ and $Y_{BLK}$ of the compression target block. --, therefor.

Column 42, approx. Line 13-14, Delete "$Y1'=$" and insert -- $Y2'=$ --, therefor.

In the Claims

Claim 5, Column 44, Line 37, delete "imaqe" and insert -- image --, therefor.

Claim 5, Column 44, Line 47, delete "imaqe" and insert -- image --, therefor.

Signed and Sealed this  
Seventh Day of July, 2020

Andrei Iancu  
*Director of the United States Patent and Trademark Office*